United States Patent [19]

McInerney et al.

[11] Patent Number: 5,325,533

[45] Date of Patent: Jun. 28, 1994

[54] ENGINEERING SYSTEM FOR MODELING COMPUTER PROGRAMS

[75] Inventors: Peter J. McInerney, Cupertino; Curtis A. Bianchi, Saratoga, both of Calif.

[73] Assignee: Taligent, Inc., Cupertino, Calif.

[21] Appl. No.: 85,271

[22] Filed: Jun. 28, 1993

[51] Int. Cl.⁵ .............................................. G06F 15/20
[52] U.S. Cl. ............................. 395/700; 364/DIG. 1; 364/280.4; 364/275.6
[58] Field of Search ............................... 364/DIG. 1; 395/500 MS File, 700 MS File

[56] References Cited

U.S. PATENT DOCUMENTS

| | | | |
|---|---|---|---|
| 4,330,822 | 5/1982 | Dodson | 364/DIG. 1 |
| 4,589,068 | 5/1986 | Heinen, Jr. | 364/300 |
| 4,809,170 | 2/1989 | Leblang et al. | 364/200 |
| 4,910,663 | 3/1990 | Bailey | 200/20 |
| 4,943,932 | 7/1990 | Lark et al. | 364/513 |
| 4,953,084 | 8/1990 | Meloy et al. | 364/200 |
| 5,124,989 | 6/1992 | Padawer et al. | 371/19 |
| 5,129,086 | 7/1992 | Coyle, Jr. et al. | 395/650 |
| 5,140,671 | 8/1992 | Hayes et al. | 395/76 |
| 5,159,687 | 10/1992 | Richburg | 395/700 |
| 5,170,465 | 12/1992 | McKeeman et al. | 395/700 |
| 5,175,856 | 12/1992 | Van Dyke et al. | 395/700 |
| 5,182,806 | 1/1993 | McKeeman et al. | 395/700 |
| 5,187,789 | 2/1993 | O'Hair | 395/700 |
| 5,193,190 | 3/1993 | Janczyn et al. | 395/700 |
| 5,193,191 | 3/1993 | McKeeman et al. | 395/700 |
| 5,201,050 | 4/1993 | McKeeman et al. | 395/700 |
| 5,204,960 | 4/1993 | Smith et al. | 395/700 |
| 5,257,363 | 10/1993 | Shapiro et al. | 395/500 |

*Primary Examiner*—Thomas M. Heckler
*Attorney, Agent, or Firm*—Keith Stephens

[57] ABSTRACT

A human oriented object programming system provides an interactive and dynamic modeling system to assist in the incremental building of computer programs which facilitates the development of complex computer programs such as operating systems and large applications with graphic user interfaces (GUIs). A program is modeled as a collection of units called components. A component represents a single compilable language element such as a class or a function. The three major functionality are the database, the compiler and the build mechanism. The database stores the components and properties. The compiler, along with compiling the source code of a property, is responsible for calculating the dependencies associated with a component. The build mechanism uses properties of components along with the compiler generated dependencies to correctly and efficiently sequence the compilation of components during a build process.

46 Claims, 26 Drawing Sheets

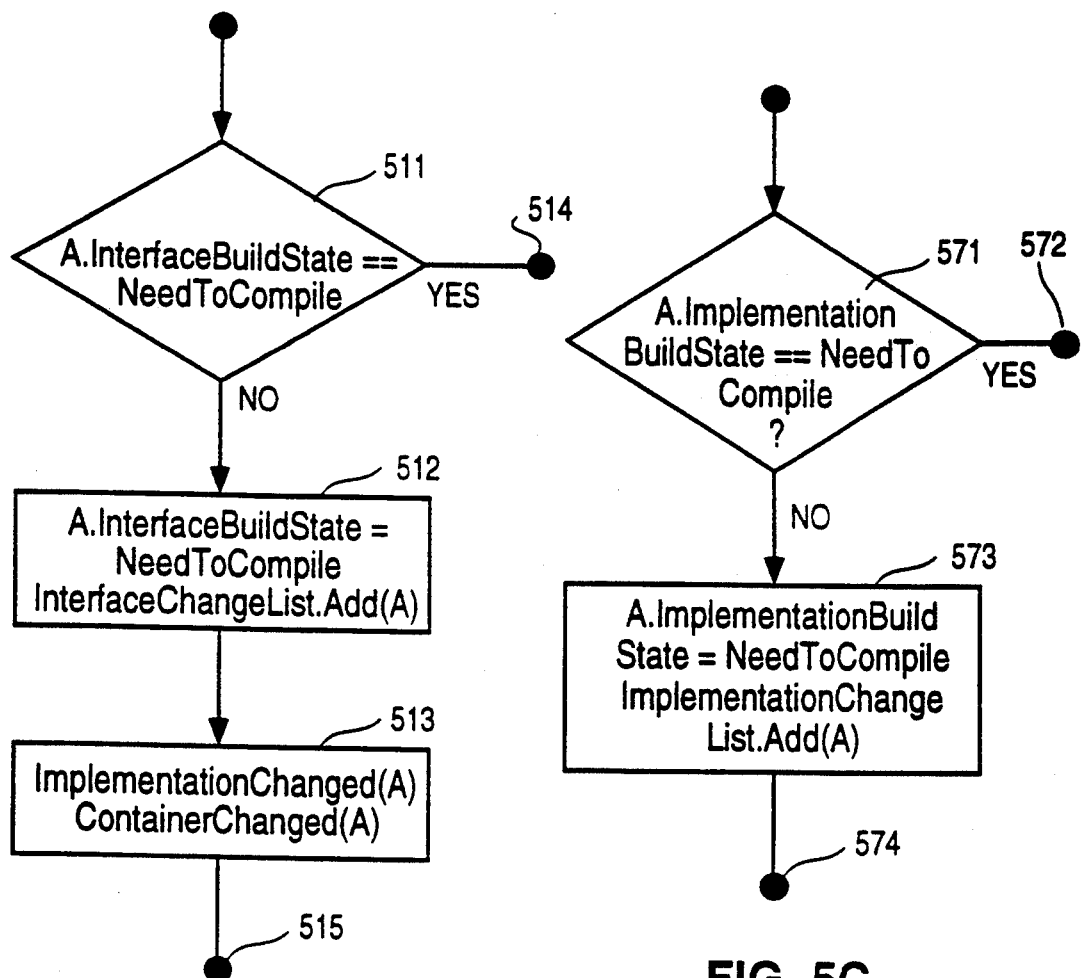
FIG. 5B
FIG. 5C
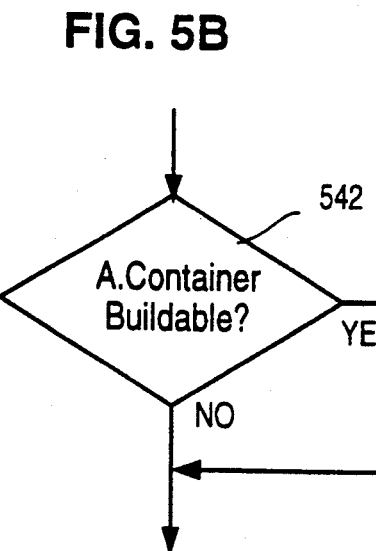
FIG. 5D

| Reference Type | Example | Address returned @ link time | Result | |
|---|---|---|---|---|
| code-to-code | Foo(); | j_Foo | code:<br>linkage: | bsr j_Foo<br>j_Foo: bra Foo |
| code-to-data (external) | gVal = 1; | r_gVal | code:<br><br><br>linkage: | movea r_gVal(pc),a0<br>move (a0), a0<br>move #1,(a0)<br>r_gVal: &gVal |
| code-to-data (internal) | gVal = 1; | gVal | code: | movea gVal(pc),a0<br>move #1, a0 |
| data-to-data | int& pi = i; | 0 | data: | pi: (i @ load time) |
| data-to-code | void (*pnf)() = &Foo; | 0 | data: | pnf: (j_Foo @ load time) |

FIG. 25

ENGINEERING SYSTEM FOR MODELING COMPUTER PROGRAMS

BACKGROUND OF THE INVENTION

1. Field of the Invention

The present invention generally relates to computer aided software engineering (CASE) and, more particularly, to human oriented object programming system (HOOPS) which provides an interactive and dynamic environment for computer program building. The invention allows a programmer to perform fine granularity source code editing in a computer program with an optimizing incremental compiler which is especially useful in developing complex programs, such as operating system (OS) software and large applications having graphic user interfaces (GUIs). The invention is disclosed in terms of a preferred embodiment which uses a popular object oriented programming (OOP) language, C++, but the principles are applicable to other computer programming languages both object oriented and procedural and may be used to build programs using both conventional and OOP languages.

2. Description of the Prior Art

Object oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs.

The complete process of running a computer program involves translation of the source code written by the programmer to machine executable form, referred to as object code, and then execution of the object code. The process of translation is performed by an interpreter or a compiler. In the case of an interpreter, the translation is made at the time the program is run, whereas in the case of a compiler, the translation is made and stored as object code prior to running the program. That is, in the usual compile and execute system, the two phases of translation and execution are separate, the compilation being done only once. In an interpretive system, such as the Smalltalk interpreter, the two phases are performed in sequence. An interpreter is required for Smalltalk since the nature of that programming environment does not permit designation of specific registers or address space until an object is implemented.

A compiler comprises three parts; the lexical analyzer, the syntax analyzer, and the code generator. The input to the lexical analyzer is a sequence of characters representing a high-level language program. The lexical analyzer divides this sequence into a sequence of tokens that are input to the syntax analyzer. The syntax analyzer divides the tokens into instructions and, using a database of grammatical rules, determines whether or not each instruction is grammatically correct. If not, error messages are produced. If correct, the instruction is decomposed into a sequence of basic instructions that are transferred to the code generator to produce a low-level language. The code generator is itself typically divided into three parts; intermediate code generation, code optimization, and code generation. Basically, the code generator accepts the output from the syntax analyzer and generates the machine language code.

To aid in the development of software, incremental compilers have been developed in which the compiler generates code for a statement or a group of statements as received, independent of the code generated later for other statements, in a batch processing operation. The advantage of incremental compiling is that code may be compiled and tested for parts of a program as it is written, rather than requiring the debugging process to be postponed until the entire program has been written. However, even traditional incremental compilers must reprocess a complete module each time.

Optimizing compilers produce highly optimized object code which, in many cases, makes debugging at the source level more difficult than with a non-optimizing compiler. The problem lies in the fact that although a routine will be compiled to give the proper answer, the exact way it computes that answer may be significantly different from that described in the source code. Some things that the optimizing compiler may do include eliminating code or variables known not to affect the final result, moving invariant code out of loops, combining common code, reusing registers allocated to variables when the variable is no longer needed, etc. Thus, mapping from source to object code and vice versa can be difficult given some of these optimizations. Inspecting the values of variables can be difficult since the value of the variable may not always be available at any location within the routine. Modifying the values of variables in optimized code is especially difficult, if not impossible. Unless specifically declared as volatile, the compiler "remembers" values assigned to variables and may use the "known" value later in the code without rereading the variable. A change in that value could, therefore, produce erroneous program results.

While there have been many advances in the art of computer program building, testing and developing, the known software development tools still place a substantial burden on the programmer, often requiring insightful intuition. In addition, traditional batch oriented programming systems provide for very long edit-compile-test cycles which is very disruptive to the creative act of programming.

SUMMARY OF THE INVENTION

It is therefore an object of the present invention to provide a human oriented, interactive and dynamic process for modeling computer programs which promotes better programmer focus and concentration, and hence greater productivity.

According to the invention, program building is made possible by the interaction of an incremental program model, called a project, and three major functionalities. A program is modeled as semantic units called components made up of a list of named data items called properties. Rather than storing a program as a loose collection of files as is done in traditional systems, the human oriented object programming system (HOOPS) of the invention stores all the information about the program in the project.

In HOOPS, components are the granularity for incremental compilation; that is, a component represents a single compilable language element such as a class or a function. A component is composed of a set of properties which are divided into two parts, an externally visible (or public part) called the Interface and an Implementation (the private part). This means that a component can only be dependent on the interface of another component. All the components in a project are organized into a tree structure, with the base of the tree being a root component called the project component.

The three major functionalities are the database, the compiler and the build mechanism. The database persistently stores and retrieves the components and their properties. The compiler, along with compiling the source code of a property, is responsible for calculating the dependencies associated with a component. The build mechanism uses properties of components along with the compiler generated dependencies to correctly and efficiently sequence the compilation of components during a build process. The build mechanism has a global view of a program at all times. This contrasts with the traditional approach where the program is represented by a set of files that are compiled independently of each other. Files used in traditional programming environments impose a particular fixed order of processing on the semantic units contained in the files.

The system automatically keeps track of editing changes in components, including whether a change was in the Interface or Implementation. This in contrast to conventional systems that track only at the file level. Dependency analysis is automatic and is based on relations between components. The system includes a mechanism that allows the compiler to record not only the fact that a dependency exists, but what sort of dependency it is. This allows the build mechanism to determine with more precision which components actually need compilation, making the system more efficient than recompiling all components for which a dependency exists whether recompilation is needed or not.

Conventional compilers make use of software construction tools in the programming environment to facilitate generating the software. For example, it is customary in conventional program construction to partition the overall program into modules, typically stored within individual files, each of which may be processed in different ways. A Make command is employed to manage and maintain the modules making up the computer program; that is, the Make function keeps track of the relationships between the modules of the program and issues only those commands needed to make the modules consistent after changes are made. It is necessary, however, for the programmer to generate a Makefile specification that defines the relationships (dependencies) between the modules. The requirement for a Makefile specification means that the programmer must be able to decide when a dependency occurs and places the burden of synchronizing dependencies on the programmer. In practice, this usually means both the existence of unnecessary dependencies and the omission of necessary dependencies, both of which can be a source of error in the building of the computer program.

In contrast to the Make function, the build mechanism, according to the present invention, differs in that the programmer does not generate a specification like the Makefile specification. The build mechanism assumes no preknowledge of dependencies; in effect, it "discovers" the dependencies of the components and keeps track of those dependencies. This means that the build mechanism will build a program from scratch when there is no preexisting dependency information. In the initial build operation, all components are listed in a change list. A compilation of a component on the change list is attempted, but if that compilation is dependent on the compilation of another component, the compilation of the first component is either suspended or aborted and the compilation of the second component is attempted and so on until a component is found which can be compiled. Then the build mechanism works back through components for which compilation was earlier suspended or aborted making use of any information already generated earlier in this process.

The build mechanism orders compilations so that all Interfaces are compiled before any Implementation. This reduces the number of possible cross dependencies and hence increases efficiency. The build mechanism utilizes a form of finite state machine to control the processing of components and to help ensure their correct ordering in a manner to minimize the suspended or aborted compilations of components.

A build operation after a change has been made (editing a component or adding or deleting a component) is similar to the initial build operation except that the change list contains only those components which have been changed, and the build mechanism uses the previously developed client and source reference lists to recompile only those components requiring recompilation. The function-level incremental compilation implemented by the invention greatly reduces the turnaround time from program change to test since a much smaller proportion of a program will typically be rebuilt.

The program model provides a method for storing and reusing an internal processed form for Interfaces (called the Declaration property). The compiler stores the processed internal form of an Interface so that it can be used more efficiently when compiling some other component. This is in contrast to traditional systems where interfaces to be used are "included" in every file where a use is made and reprocessed to an internal form by the compiler every time. Additionally, the program model of components and properties provides a natural way to store information closely coupled with a particular component. This information can be used either directly by the programmer or indirectly by other tools. In traditional systems, such data is either forgotten at the end of a compile or is only loosely coupled with the program source.

Error processing allows the build mechanism to avoid compiling components that depend on components with errors. The build mechanism will correctly build as much of the project as possible. These both contrast with traditional systems which often stop at the first erroneous file or, if they proceed, will repeatedly process erroneous included files. Error processing allows warning messages to be issued by the compiler without causing the specific component to be treated as in error. This processing allows the program to be correctly built even when warnings are issued.

The invention further provides an incremental linking facility which is the complement to the incremental compilation facility. Functions are linked into existing executables, replacing old versions. There is no need to reprocess the entire set of object files as in traditional systems. This processing reduces link times from minutes to seconds during program development.

Access to any stored information about any part of a user's program is immediately available from wherever it is referenced, providing a hyperlink style navigation within the program. Some systems support a facility which allows quick access from an object's use to its definition, but HOOPS goes beyond this by supporting immediate access to any information (e.g., definition, documentation, clients, references, etc.) from any reference to the object (in source code, in object code, in documentation, etc.). This greatly reduces the time spent rummaging around in the program, libraries, documentation, etc., during both development and maintenance.

HOOPS also provides a dynamic browser facility which allows users to build browsing tools dynamically, by splitting windows into multiple panes, installing "viewers" and then drawing connections between them to indicate interactions between them. This facility cuts down on window proliferation and speeds navigation.

The preferred embodiment of the invention is written in C++ and is used to build programs in C++, C and Assembler, these being the most popular languages currently in use. The programs built using the invention typically use all three of these languages. Thus, while the invention is itself an object oriented program written in an object oriented programming language, it is not limited to building programs in object oriented programming languages but is equally useful in building programs in procedural languages. Moreover, the invention is not limited to the C++ language, but may be implemented in other programming languages, and the invention is not limited in its application to these three languages; that is, the teachings of the invention may be used in a human oriented object programming system of more general application.

BRIEF DESCRIPTION OF THE DRAWINGS

The foregoing and other objects, aspects and advantages will be better understood from the following detailed description of a preferred embodiment of the invention with reference to the drawings, in which:

FIGS. 5A to 5D, taken together, are a flowchart of the logic of registering editing changes through Build-States;

FIG. 13 is a pictorial representation of the computer screen shown in FIG. 12 with the browser wiring turned on;

FIG. 25 illustrates different types of references and linker modification of the references in accordance with a preferred embodiment.

DETAILED DESCRIPTION OF A PREFERRED EMBODIMENT OF THE INVENTION

Figure 1:
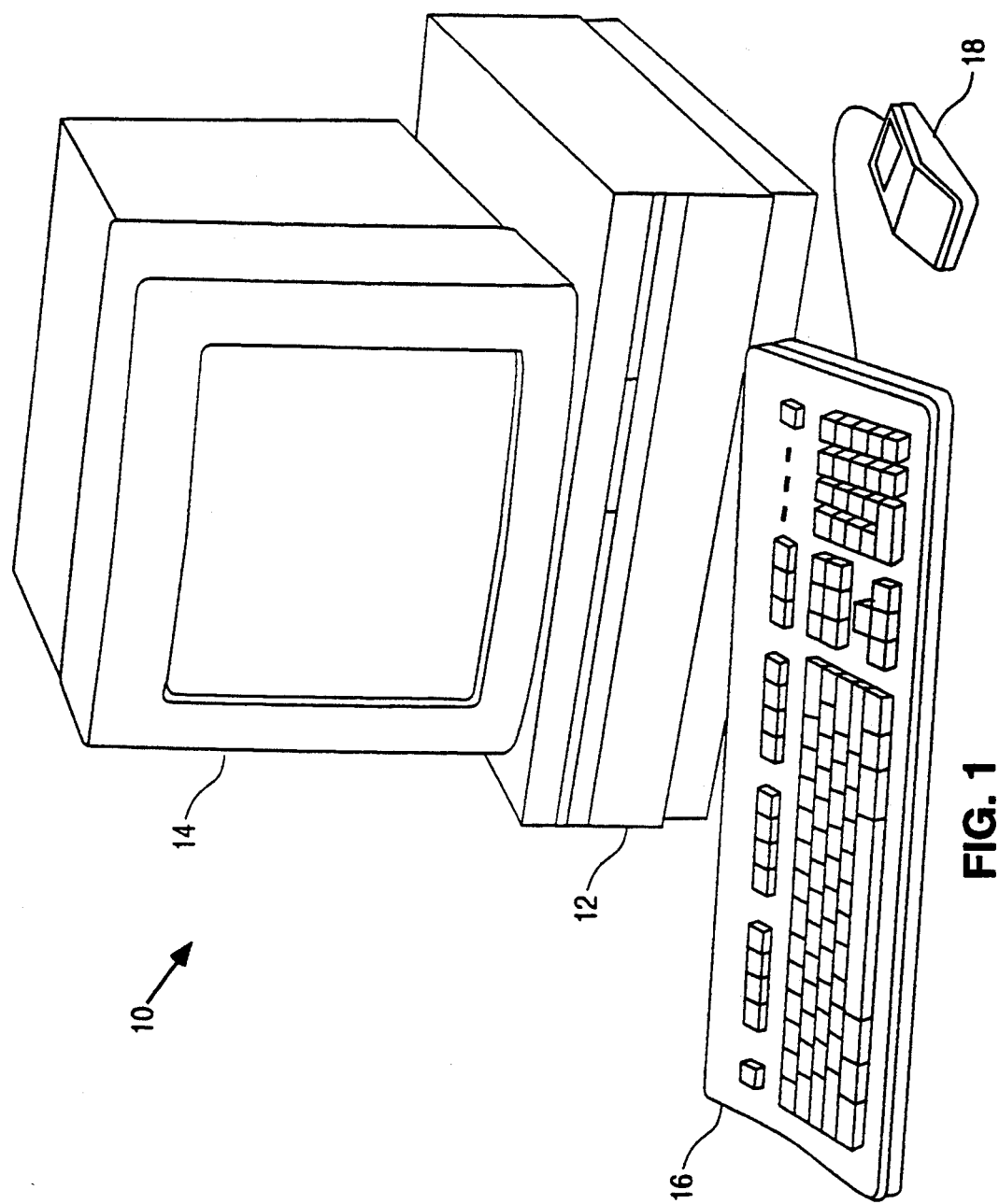
FIG. 1 is a pictorial diagram showing a general purpose computer system capable of supporting a high resolution graphics display device and a cursor pointing device, such as a mouse, on which the invention may be implemented.

Referring now to the drawings, and more particularly to FIG. 1, there is shown a general purpose computer 10. The computer 10 has a system unit 12 a high resolution display device 14, such as a cathode ray tube (CRT) or, alternatively, a liquid crystal display (LCD). The type of display is not important except that it should be a display capable of the high resolutions required for windowing systems typical of graphic user interfaces (GUIs). User input to the computer is by means of a keyboard 16 and a cursor pointing device, such as the mouse 18. The mouse 18 is connected to the keyboard 16 which, in turn, is connected to the system unit 12. Alternatively, the mouse 18 may be connected to a dedicated or serial port in the system unit 12. Examples of general purpose computers of the type shown in FIG. 1 are the Apple Macintosh ® (registered trademark of Apple Computer) and the IBM PS/2. Other examples include various workstations such as the IBM RISC System/6000 and the Sun Microsystems computers.

Figure 2:
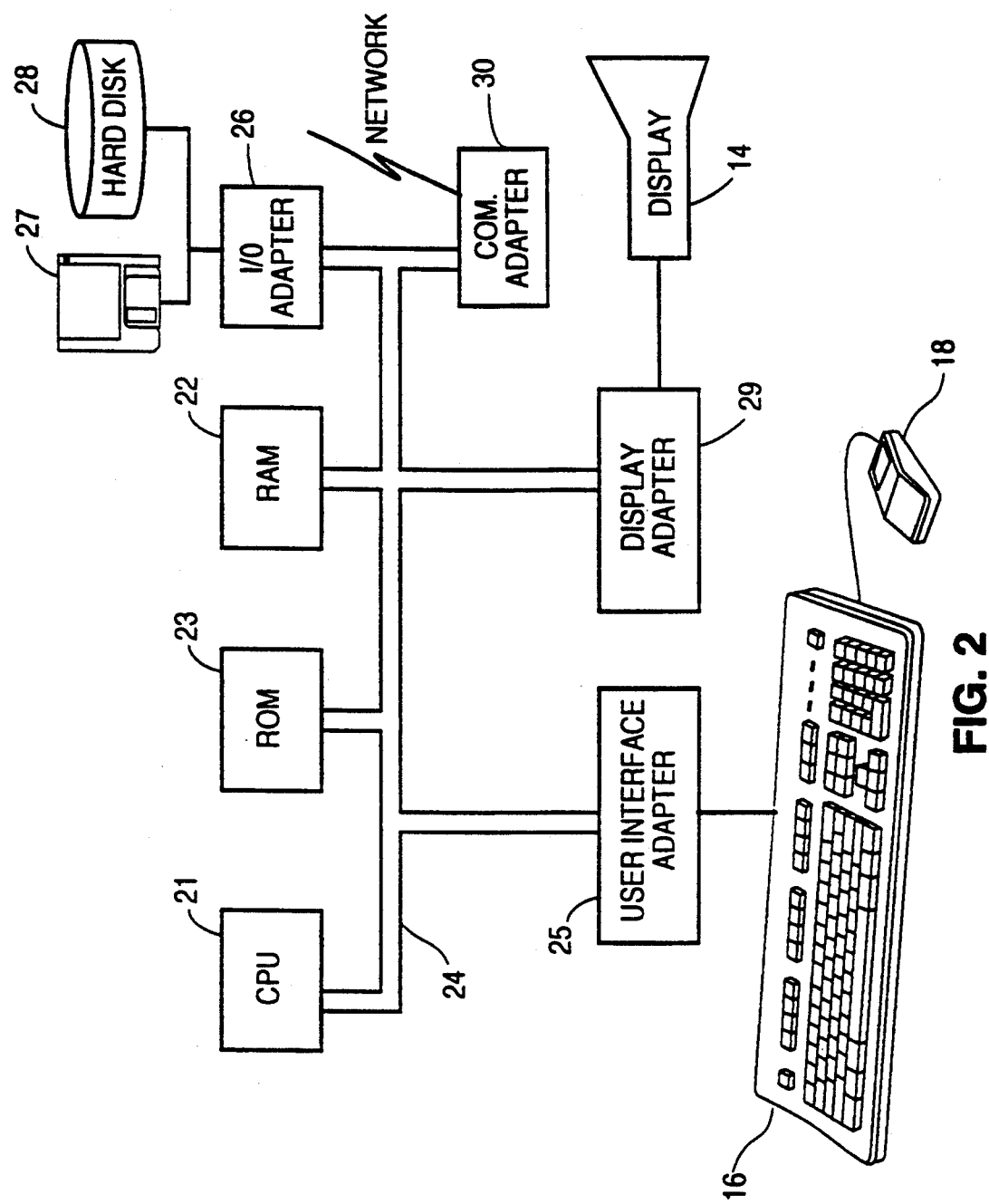
FIG. 2 is a block diagram of the general purpose computer system illustrated in FIG. 1 showing in more detail the principle elements of the computer system.

FIG. 2 illustrates in more detail the principle elements of the general purpose computer system shown in FIG. 1. The system unit 12 includes a central processing unit (CPU) 21, random access memory (RAM) 22, and read only memory (ROM) 23 connected to bus 24. The CPU 21 may be any of several commercially available microprocessors such as the Motorola 68030 and 68040 microprocessors commonly used in the Apple Macintosh ® computers or the Intel 80386 and 80486 microprocessors commonly used in the IBM PS/2 computers. Other microprocessors, such as RISC (for reduced instruction set computer) microprocessors typically used in workstations, can also be used. The ROM 24 stores the basic microcode, including the basic input/output system (BIOS), for the CPU 21. The operating system (OS) for the computer system 10 may also be stored in ROM 24 or, alternatively, the OS is stored in RAM 22 as part of the initial program load (IPL). RAM 22 is also used to store portions of application programs and temporary data generated in the execution of the programs. The bus 24 may be the Apple NuBus ®, the IBM MicroChannel ® or one of the industry standards such as the ISA (industry standard adapter) or EISA (extended industry standard adapter) buses.

Also connected to the bus 24 are various input/output (I/O) adapters, including a user interface adapter 25 and an I/O adapter 26. The keyboard 16 is connected to the user interface adapter 25, and the I/O adapter 26 connects to a floppy disk drive 27 and a hard disk drive 28. The floppy disk drive 27 allows the reading and writing of data and programs to removable media, while the hard disk drive 28 typically stores data and programs which are paged in and out of RAM 22. The display device 14 is connected to the bus 24 via a display adapter 29. A communication adapter 30 provides an interface to a network. Other supporting circuits (not shown), in the form of integrated circuit (IC) chips, are connected to the bus 24 and/or the CPU 21. These would include, for example, a bus master chip which controls traffic on the bus 24. The bus 24 may, in some computers, be two buses; a data bus and a display bus allowing for higher speed display operation desirable in a graphic user interface.

Definitions

Program

As used in the description of the invention, a HOOPS program consists of one non-buildable component called the Project and a collection of "buildable components". It is also possible to store non-buildable components, but in this description, whenever an unqualified component is mentioned, what is meant is a "buildable component". Non-buildable components will not be compiled during a build operation.

Component

A component has a unique identity and is named. Different components are distinguished by some form of unique Identifier called an ID. There is a distinguished ID called NullID which belongs to no component. The ID is assigned when a component is created and is never changed during the existence of the component. If a component is deleted, its ID is never reused. In practice, IDs are usually numerical.

A component also has a name which consists of a string of text containing no white space. There is no requirement that different components have different names. It is possible to obtain a list (possibly empty) of all components whose names match some given text string. A component's name may be changed any number of times during the existence of the component.

Each buildable component is associated with a specific computer language. In practice, the computer language is usually identified by a string of text. Each computer language has a compiler associated with it which is to be used when compiling any component with that language. In practice, it is possible for a given computer language to be associated with more than one compiler. In this case, the component must record both the language and some way of identifying the specific compiler.

A specific language has a specific set of component kinds associated with it and a specific set of property implementations, possibly differing for every kind. Thus, distinct semantic elements in a particular language may be structured in different ways according to need.

Components have BuildStates. A BuildState is a value from the list NeverCompile, Compiled, NeedToCompile, Uncertain, BeingCompiled, CompileError, and UncertainError. In practice, these values are usually numerical. Each component has a pair of BuildStates called InterfaceBuildState and ImplementationBuildState. Every component has both these buildstates whether it is buildable or non-buildable. For a non-buildable component, these BuildStates are both NeverCompile.

BuildStates may be accessed and changed. Setting a component's BuildState to the same value again is allowed and causes no effect. Changing a BuildState may have well defined side-effects such as changing the BuildState of another property of the same or a different component or, for example, adding or deleting references from some list such as a list of changes or a list of errors.

Components are used to represent semantic language elements. The way that this is done depends on the particular computer language being modeled. For example, in C++ a partial list of language elements represented by components includes global data, global functions, classes, data members, member functions, typeders, enums, enumerators, macros, unions and structs. Typically, each semantic element will have an associated distinct kind.

Properties

A component consists of a collection of named properties. A property represents some data associated with the component. It is possible to retrieve or store data given a component's ID and a property name. In practice, property names are usually internally represented by numbers identifying the names (such numbers are sometimes called tokens). There is a distinguished property name called NullProperty which belongs to no property.

The data associated with a given property is different for different components. Changing the data for a given property for one component does not imply changing the data for the same property of any other component. However, it is possible for a change in one property of a component to cause a change in another property of the same or another component.

A pair consisting of an ID and a property name is called a reference. A reference uniquely identifies a particular piece of property data. Often a reference is loosely used as though it were the component and/or property to which it refers. In practice, a reference typically contains other information which is not used directly in program building, identifying which version of the data and which subsection of the data in the property is being referenced.

All components must have the properties Name and Container. The Name property stores the component's name. The Container property contains a single reference in which the property name is NullProperty. Starting from any component and successively replacing it with the component referred to by its Container ID will always eventually result in the Project component. The Container ID of the Project is NullID. Thus, all components are described as being in the Project.

The built property (also called the components built list) records the list of properties correctly compiled in the last build, in the order that they were built. The same property should only appear at most once on this list. It is used for testing and debugging.

Project Component

A project is a component that has, in addition, the properties ChangeList and ErrorList. The ChangeList property is a list of references. The references describe the components and properties that have changed since the last build. In practice, the ChangeList may be represented by more than one list sorted in some fashion for efficiency in building a program. The ErrorList property is also a list of references. These references describe the components which were listed as having errors during the last program build. The references all have Errors as their property. Associated with each reference is a numerical key. This key is used in conjunction with the specified Errors property to locate a specific message and a particular subrange of specified property of the component.

Buildable Component

A buildable component must also have properties Declaration, ObjectCode, Clients, SourceReferences, Errors and may have properties Interface, Implementation, and Members.

The Declaration property represents a data cache for the compiler. This may be empty, as for example before the component has ever been compiled. In practice, it may be thought of as an entry in the compiler's symbol table, although the stored representation may differ from the compiler's internal representation.

The ObjectCode property represents the executable code for the component. This may be empty, as for example before the component has ever been compiled or because no object code is associated with this component. In practice, it usually provides a means of pointing at the actual code which is stored elsewhere.

The Clients and SourceReferences properties are collections of pairs consisting of a reference and a dependency. A dependency is a list of changes. A change may be represented as a string of text chosen from a distinguished finite list of strings. There is a distinguished change called Public which is used to distinguish references to a component in the Implementation property only, as opposed to uses in the Interface property. A dependency can be represented as a bit vector with the nth bit being "1" if the nth change in the list is present and "0" otherwise.

The Errors property consists of a list of triples. Each triple consists of a key, a property name, and a message. A key is a numerical identifier. A given key may appear only once in a particular Errors property at one time. The property name is usually Interface or Implementation. The message is some piece of text and/or graphics.

The Interface and Implementation properties are properties representing the source text of the component. The Source text may be stored as tokens rather than text and be accessed in different forms if required. The text represented by these properties may be changed by editing it manually in the programming environment. One possibility is for the Interface data to be stored as structured fields from which the source text can be reconstructed as required.

The Members property is the collection (possibly empty) of references, one for each component in the Project that has this component as its Container.

Attributes

A component has a number of attributes. An attribute is either True or False. In practice, an attribute is usually represented by a single bit of memory with the values True and False represented by the numbers "1" and "0". All components have the attribute IsBuildable. If this attribute is true, and the component is buildable; otherwise, it is non-buildable. A component may be always non-buildable or temporarily non-buildable (because of the action of some temporary condition).

Buildable components also have the attribute IsInline. When this attribute is True, the Implementation of a component is public, and this means that other components can be dependent on changes to the Implementation. If it is False, Implementation changes never cause changes in other components.

Buildable components also have the attribute IsSynthetic. This attribute is True for components that are created during the build process by the compiler. It is False for components created manually by the programmer. Synthetic components are provided to allow compilers to create components corresponding to default language elements that are required but do not need to be explicitly created by the programmer. In practice, it may be possible to change the IsSynthetic attribute from True to False, for example if a synthesized component is manually edited, but the reverse transformation from False to True is never allowed. Synthetic components often do not have an Interface or Implementation property, but in any case always have their Interface and Implementation BuildStates Compiled.

Kinds

Each component has a kind. A kind is a string of text which is used to classify components into groups sharing for example the same properties or the same language specific behavior. Most kinds are specific to a particular computer language and are used to designate semantically distinct language elements.

There are, however, some kinds defined by the system. These are the kinds Project, Library and Container. These kinds are only applied to non-buildable components. The Project kind is the kind of the Project component. The Library kind is applied to collections of components that are to be linked into a single external block of object code such as a shared library or application. The Container kind is applied to components which are used to group other components for organizational purpose. In practice, kinds are usually internally represented numerically.

Overview of the Invention

Figure 3:
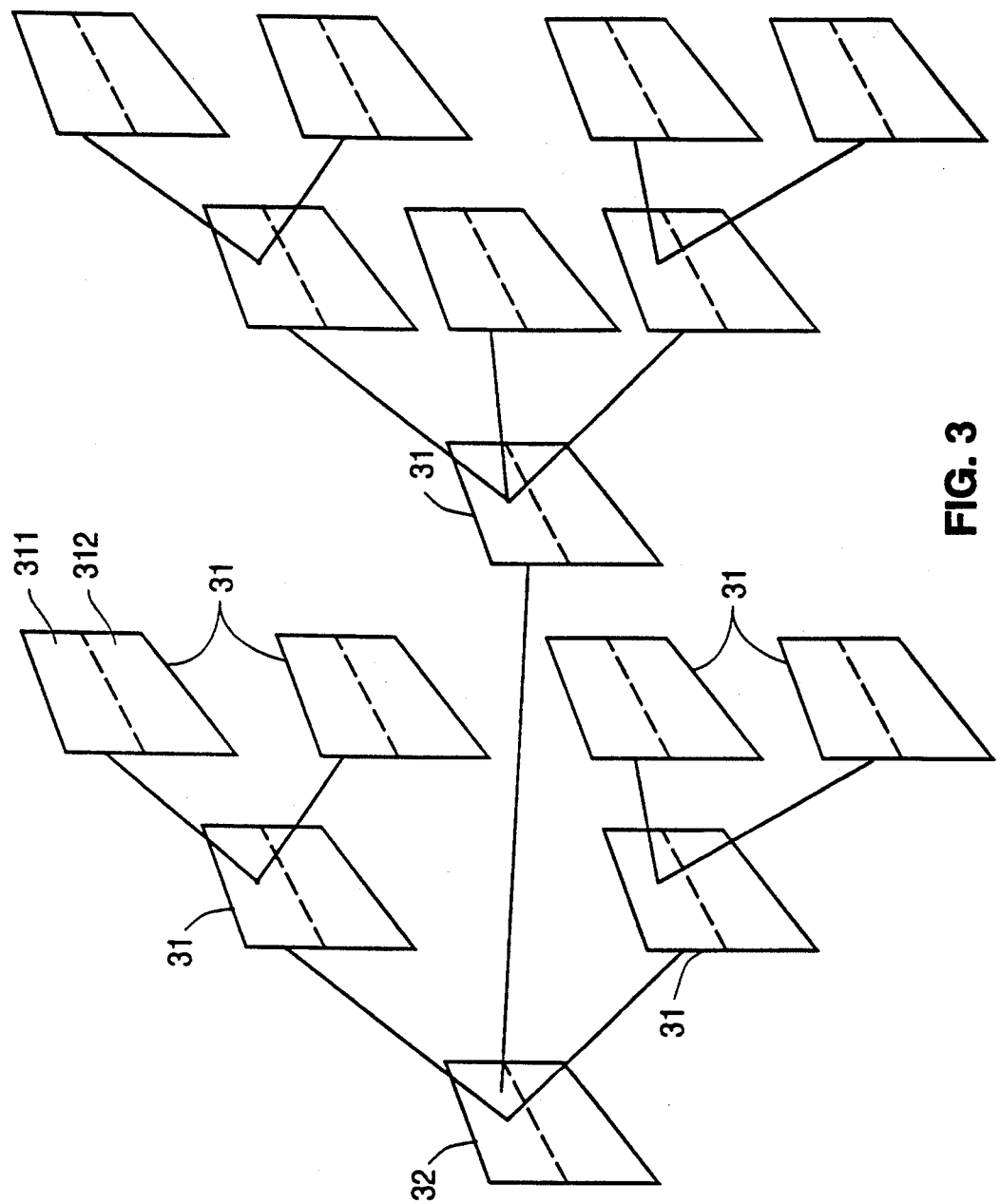
FIG. 3 is a block diagram showing in conceptual form a collection of components which compose a program.

FIG. 3 provides a conceptual representation of a program as composed of a set of components 31. Each component is composed of a set of properties which are divided into two parts, the externally visible (or public) part 311 called the Interface and the Implementation 312 (the private part). As shown in FIG. 3, components are dependent only on the interface of another component. All the components in a project are organized into a tree structure, with the base of the tree being a root component 32 called the project component. As will be understood by those skilled in the art, the components are not necessarily self-contained entities but may include pointers pointing to storage locations for actual code. Nevertheless, this tree-structured representation is useful in presenting the organization of a program and, therefore, a singular tree-structured representation is used in one of the user screens described hereinafter.

Figure 4:
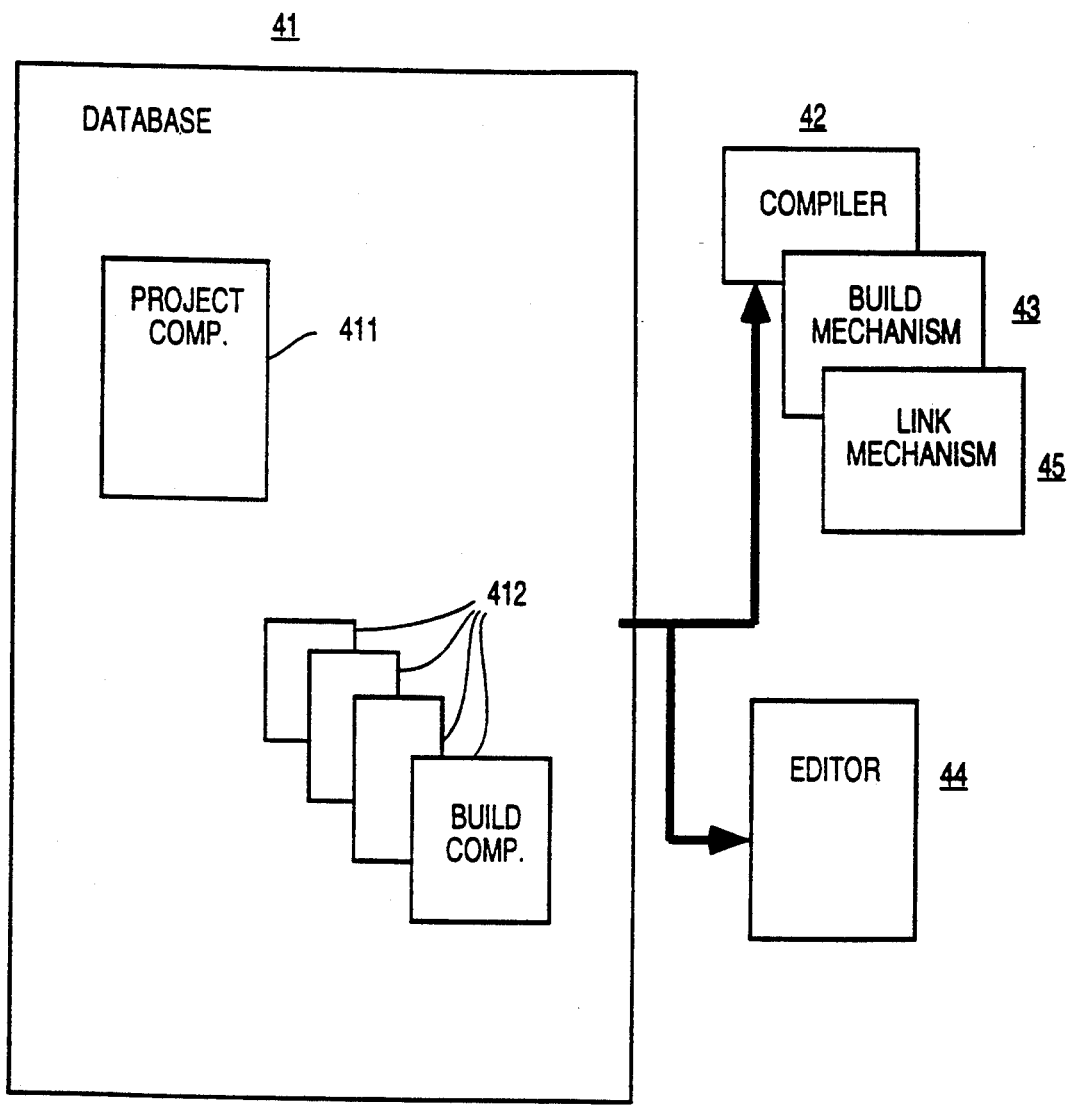
FIG. 4 is a block diagram showing the principles functionalities of the invention.

FIG. 4 is a block diagram showing the three major functionalities of the invention. These are the database 41, the compiler 42, and the build mechanism 43. The database 41 is composed of a set of components, here shown as a project component 411 and a collection of buildable components 412 which model a program which is to be built. The compiler 42 calculates the dependencies associated with the components in the database 41. The build mechanism 43 uses properties of components along with compiler generated dependencies to build the program.

A programmer changes the program by means of an editor 44. The editor must be capable of creating and deleting components, and typically of cutting, copying, pasting and moving components. The editor must be capable of changing the data in the Interface and Implementation properties usually by allowing direct modification of text, although other more structured approaches such as selection from menus are possible. In practice, the editor 44 will often consist of a number of editors, possibly as many as one for each type of Interface or Implementation property or possibly even for subfields of data in those properties.

Method For Registering Editing Changes

Figure 5A:
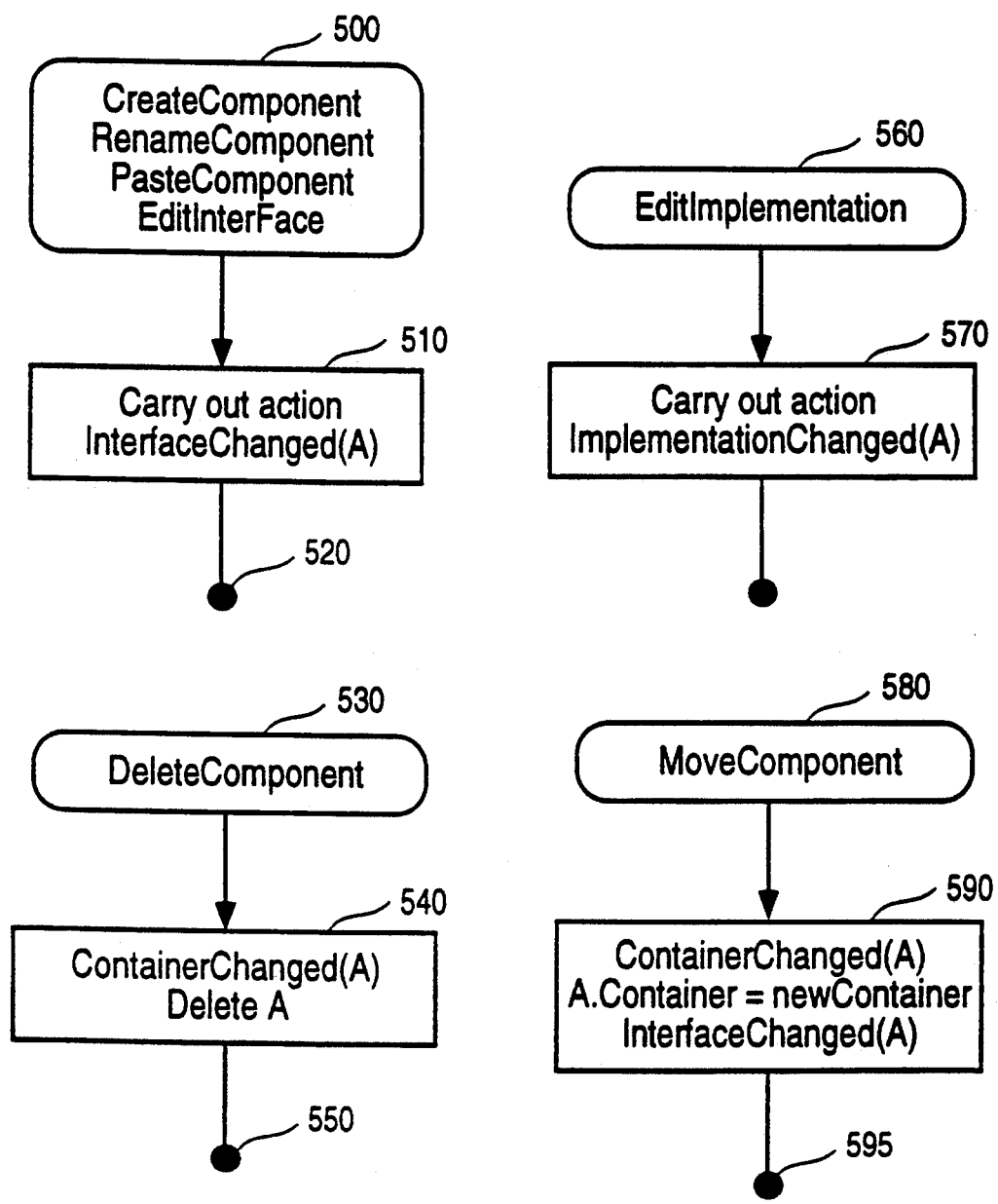

Reference is made to FIGS. 5A to 5D which show flowcharts illustrating the logic of the functions performed by the editor associated with incremental building 44. For buildable non-synthetic components, BuildStates are confined to the values Compiled and NeedToCompile outside the build process. If the Interface property is not present, the InterfaceBuildState is Compiled. If the Implementation property is not present, the ImplementationBuildState is Compiled. In FIG. 5A, the various editing state changes are presented. At label 500, when the system identifies a CreateComponent, RenameComponent, PasteComponent or EditInterface command, control passes to function block 510 to process the interface change. The detailed logic for the change is set forth in FIG. 5B.

In FIG. 5B, processing commences at decision block 511 where a test is performed to determine if the interface build state is NeedToCompile. If so, then control is passed via label 514 to continue editing. These actions take place during editing, not during the rebuild. The next action is most likely another editing action. If not, then at function block 512, the interface build state is set to NeedToCompile and the interface change list is updated accordingly. Then, at function block 513, the implementation changed and container changed processing is completed. The details of the implementation changed operation are presented in FIG. 5C and the container changed operations are detailed in FIG. 5D.

FIG. 5C sets forth the detailed processing associated with implementation changed. At decision block 571, a test is performed to determine if the implementation build state is already set to NeedToCompile. If so, then control is passed via label 572 to continue editing. If not, then at function block 573, implementation build state is set equal to NeedToCompile and implementation change list is updated accordingly. Then, control is passed back via label 574.

FIG. 5D sets forth the detailed logic associated with a container change operation. A test is performed at decision block 542 to determine if the variable is buildable. If so, then at function block 543, interface changed is called with component's container as detailed above in the discussion of FIG. 5B. Then, control returns via label 544.

If an Edit Implementation command is detected at label 560 of FIG. 5A, then processing carries out an action implementation changed as set forth in function block 570 and detailed above in the discussion of FIG. 5C.

If a Delete Component command is detected at 530 of FIG. 5A, then the container changed processing for component A is initiated as shown in function block 540 and detailed in the discussion of FIG. 5D. Then, container A is deleted, and control is returned via label 550.

If a Move Component command is detected at 580 of FIG. 5A, then the container changed processing for component A is initiated as shown in function block 590 and detailed in FIG. 5D. Then, the component's container is set equal to new container, and the interface changed processing for component A is initiated as detailed in FIG. 5B. Finally, processing is returned via label 595.

Method of Determining Components of a Build

During a program build, the Project component maintains private lists of references called CompileLists. There is an InterfaceCompileList and an ImplementationCompileList. The Project also maintains a private list of references called the InternalErrorList. In practice, each of these lists may be physically represented by more than one list for reasons of efficiency.

Figure 6:
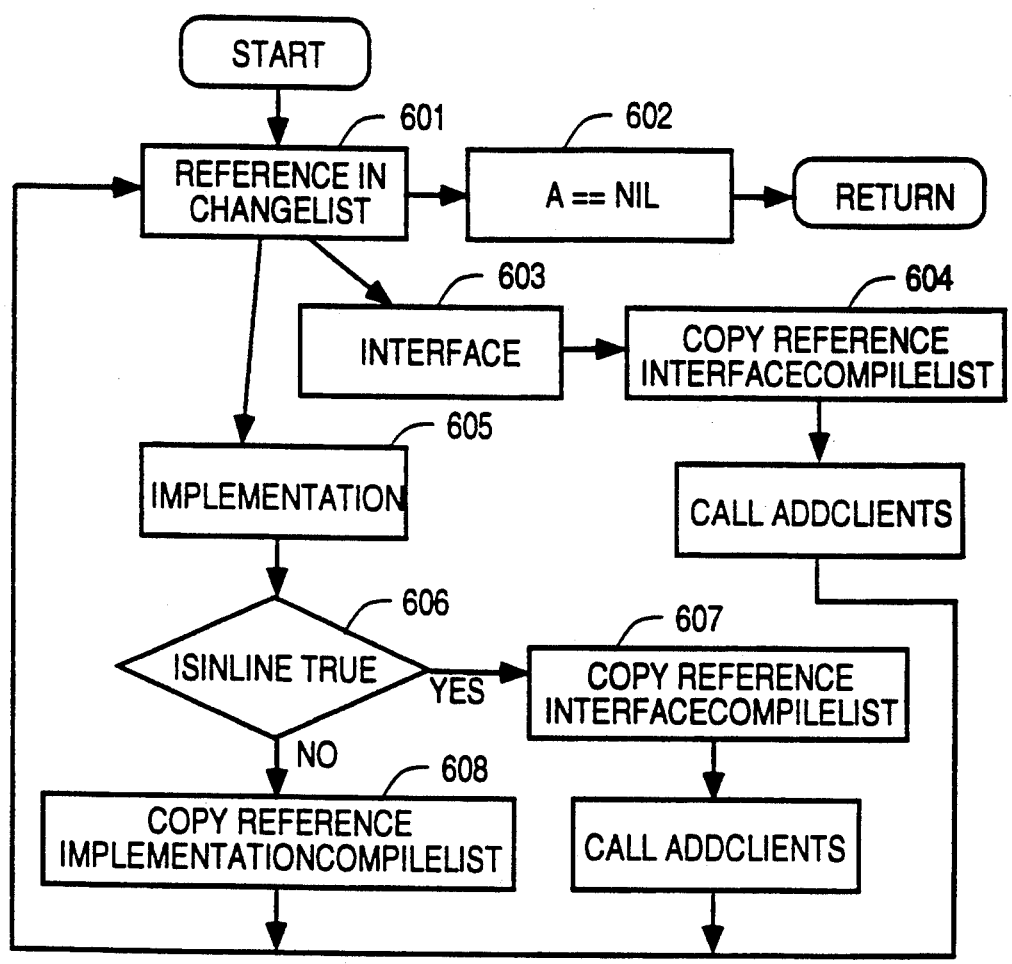
FIG. 6 is a flowchart showing the logic of determining the possible components in the first stage of the operation of the build mechanism according to the invention.

The process is shown in FIG. 6. For each reference in the Project's ChangeList, as indicated by function block 601, a reference is chosen from the front of the list. If there are no more references on the list, processing is complete as indicated at block 602. If the reference is an Interface, as determined at block 603, a copy of the reference is placed in the InterfaceCompileList in and the function AddClients is called to the reference in function block 604 before processing continues at block 601. If its property name is not Interface, then its property name is Implementation, as indicated at block 605, and a test is made in decision block 606 to determine if its IsInline attribute is True. If so, a copy of the reference is placed in the InterfaceCompileList and the function AddClients is called on the reference in function block 607 before processing continues at block 601. Otherwise, its property name must be Implementation and its IsInline attribute must be False, and a copy of the reference is placed on the Implementation CompileList in function block 608 before processing continues at block 601.

```
             The pseudocode for the function
CreateCompileLists is as follows:
CreateCompileLists(){
     for each A in ChangeList{
         if ( A.PropertyName = = Interface ){
             InterfaceCompileList.Add( A );
             AddClients( A );
         }
         else if ( A.PropertyName = = Implementation ){
             if ( IsInLine = = True ){
                 InterfaceCompileList.Add( A );
                 AddClients( A );
             }
             else if ( IsInLine = = False ){
                 ImplementationCompileList.Add( A );
             }
         }
     }
}
```

The function AddClients, for each reference in the parameter references clients properly, examines the reference and, if its BuildState is Compiled, sets the reference's BuildState to Uncertain, adds a copy of the reference to the appropriate CompileList, and calls AddClients on the reference. This process is called creating the Client Closure of the ChangeList. The Client Closure represents the subset of components that may need to be recompiled as the result of a build. In practice, dependencies and changes generated by the compiler as the build progresses are used to avoid having to compile as many components as possible in the Client Closure.

The following is the pseudo-code for the AddClients function:

```
AddClients( A ){
     for each B in A.ClientList{
         if( B.BuildState = = Compiled){
             B.SetBuildState( Uncertain );
             if( B.PropertyName = = Interface ){
                 InterfaceCompileList.Add( B );
                 AddClients( B );
             }
             else if( B.PropertyName = = Implementation ){
                 ImplementationCompileList.Add( B );
                 AddClients( B );
             }
         }
     }
}
```

Method of Processing Interfaces

Figure 7:
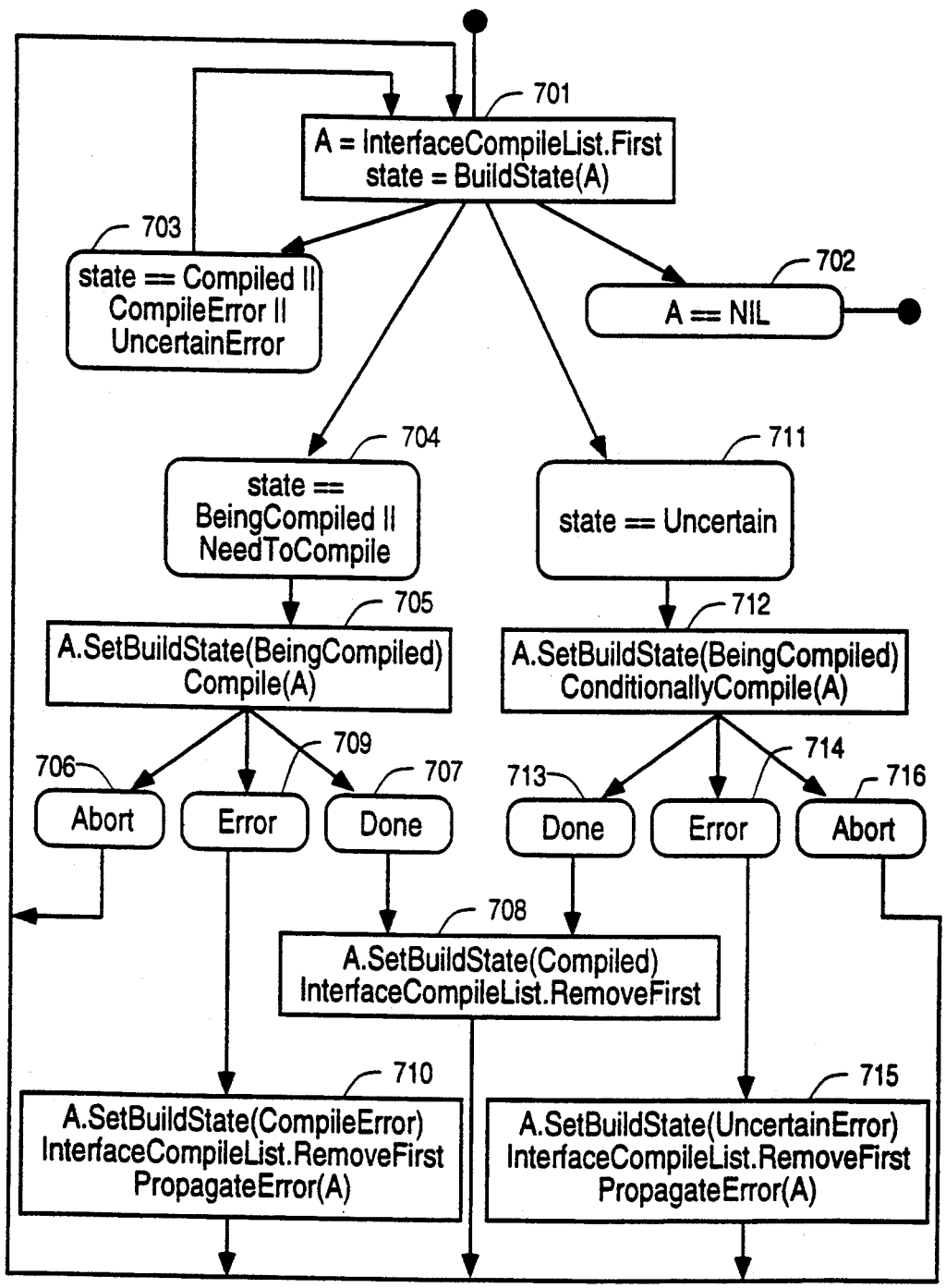
FIG. 7 is a flowchart showing the logic of processing Interfaces in the second stage of the operation of the build mechanism according to the invention.

This is the second stage of the Build process. The possible BuildStates for items on the InterfaceCompileList are Compiled, BeingCompiled, NeedToCompile, Uncertain, CompileError or UncertainError. The Interface CompileList is processed until it is empty as shown in the flowchart of FIG. 7. The process is entered at block 701 where a reference is chosen from the front of the InterfaceCompileList. If there are no more references on the list, processing is complete at block 702. If the interface BuildState of the component associated with the reference is Compiled, CompileError or UncertainError, as indicated in block 703, the reference is removed from the front of the list and processing continues in block 701. If the Interface BuildState of the component associated with the reference is BeingCompiled or NeedToCompile, as indicated in block 704, the BuildState of the component is set to BeingCompiled in function block 705. Then the Compile function (which invokes the compiler 42) is called on the Interface of the component. This function will return one of the values Abort, Done and Error. If the value returned is Abort at block 706, then processing continues at block 701. If the value returned is Done at block 707, then the Interface BuildState of the component is set to Compiled and the reference is removed from the front of the list at block 708 before processing continues with block 701. If the value returned is Error at block 709, then the Interface BuildState of the component is set to CompileError, the reference is removed from the front of the list, and the function PropagateError is called on the component in function block 710 before processing continues at block 701. If the Interface BuildState of the component associated with the reference is Uncertain, as determined at block 711, the BuildState of the component is set to BeingCompiled at function block 712. Then the ConditionallyCompile function (which may or may not call the compiler 42) is called on the Interface of the component. This function will also return one of the values Abort, Done and Error. If the value returned is Abort, then processing continues at step 1. If the value returned is Done at block 713, then the reference is removed from the front of the list at function block 708, and processing continues at block 701. If the value returned is Error at block 714, then the reference is removed from the front of the list and the function PropagateError is called on the component in function block 715 before processing continues at block 701.

The pseudocode for the ProcessInterfaces function is as follows:

```
ProcessInterfaces(){
     until( ( A = InterfaceComileLIst.First ) = = NIL ){
         state = A.BuildState;
         if( A = Compiled _ CompileError _ Uncertainerror ){
             InterfaceCompileList.RemoveFirst();
         }
         else if( A = BeingCompiled _ NeedToCompile ){
             A.SetBuildState( BeingCompiled );
             value = Compile( A );
             if( value = = Abort ){
                 continue;
             }
             else if( value = = Done ){
                 A.SetBuildState( Compiled );
                 InterfaceCompileList.RemoveFirst();
             }
             else if( value = = Error ){
                 A.SetBuildState( CompileError );
                 InterfaceCompileList.RemoveFirst();
                 PropagateError( A );
             }
         }
         else if( A = Uncertain ){
             A.SetBuildState( BeingCompiled );
             value = ConditionallyCompile( A );
             if( value = = Abort ){
                 continue;
             {
             else if( value = = Done ){
                 A.SetBuildState( Compiled );
                 InterfaceCompileList.RemoveFirst();
             }
             else if( value = = Error ){
                 A.SetBuildState( UncertainError );
                 InterfaceCompileList.RemoveFirst();
                 PropagateError( A );
             }
         }
```

```
        }
}
```

The function PropagateError adds a reference corresponding to the component to the Project's InternalErrorList and carries out the following for every reference on the component's Client list: If the reference's BuildState is CompileError or UncertainError, the process continues with the next reference. If the reference's BuildState is NeedToCompile, the process sets its BuildState to CompileError, adds the reference to the InternalErrorList, and calls PropagateError on the reference before continuing with the next reference. If the reference's BuildState is Uncertain, the process sets its BuildState to UncertainError, adds the reference to the InternalErrorList, and calls PropagateError on the reference before continuing with the next reference.

The pseudocode of the function PropagateError is as follows:

```
PropagateError( A ){
    for each B in A.ClientList {
        state = B.BuildState;
        if( state = = CompileError _ UncertainError )[
            continue;
        }
        else if( state = = NeedtoCompile ){
            B.SetBuildState( CompileError ){
            InternalErrorList.Add( B );
            PropagateError( B );
        }
        else if( state = = Unceratin ){
            B.SetBuildState( UncertainError );
            InteranlErrorList.Add( B );
            PropagateError( B );
        }
    }
}
```

Method of Processing Implementations

Figure 8:
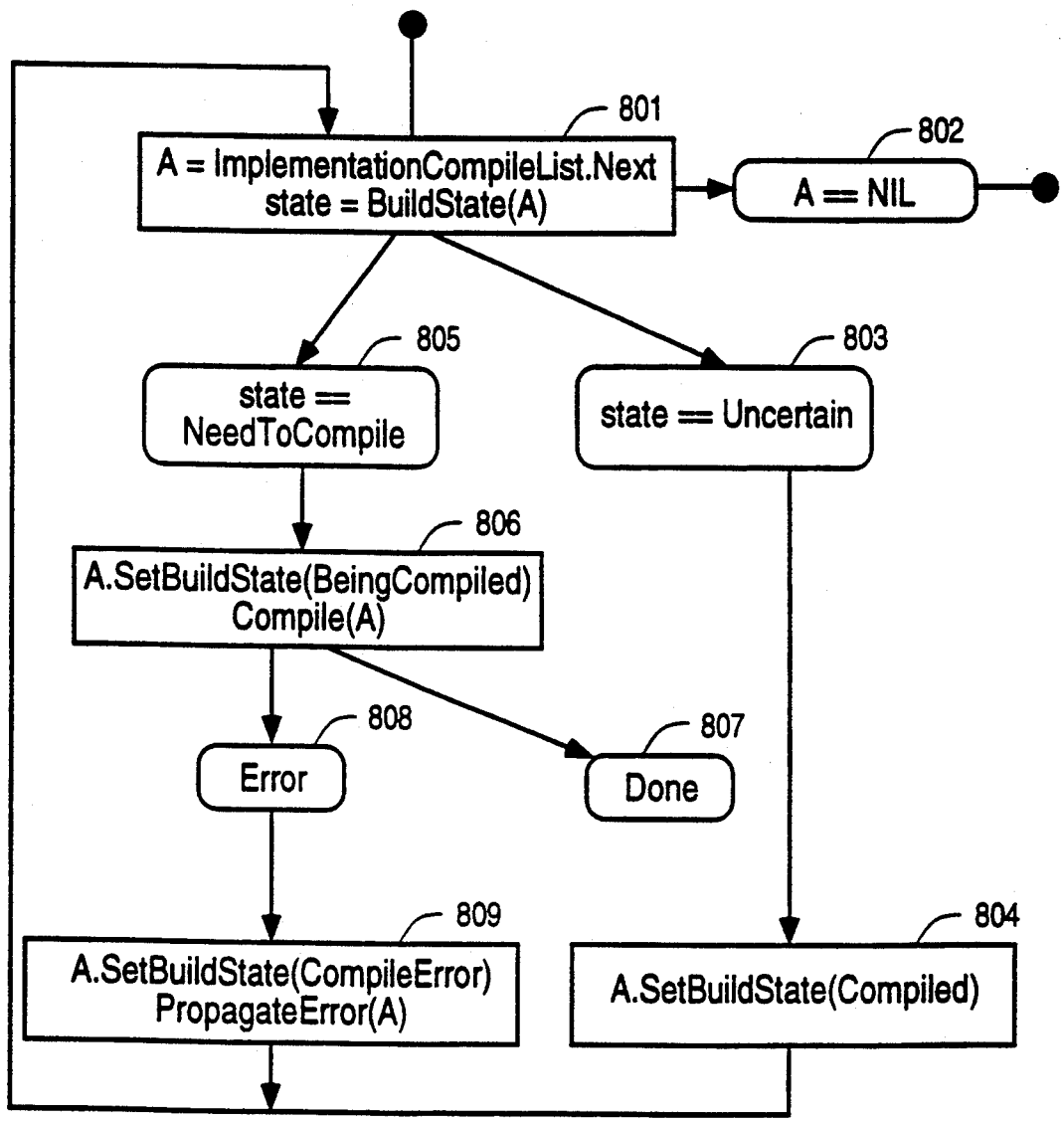
FIG. 8 is a flowchart showing the logic of processing Implementations in the third stage of the operation of the build mechanism according to the invention.

This is the third stage of the Build process. Each reference in the ImplementationCompileList is processed as shown in the flowchart of FIG. 8. The process is entered at block 801 where a reference is chosen from the front of the ImplementationCompileList. If there are no more references on the list, processing is complete at block 802. If the BuildState of the reference is Uncertain, as determined in block 803, the BuildState is set to Compiled in function block 804 before processing continues in block 801. If the BuildState of the reference is NeedToCompile, as determined in block 805, the component is compiled in function block 806. The possible values returned from the compiler 42 are Done and Error. If the value returned is Done at block 807, the BuildState of the reference is set to Compiled in function block 804 before processing continues in block 801. If the value returned is Error in block 808, the BuildState of the reference is set to CompileError and the function PropagateError is called on the component in function block 809 before processing continues in block 801. If the BuildState of the reference is CompileError or UncertainError, nothing is done. Note that the processing of Implementations is order independent at this stage because dependencies can only be on Interfaces or Implementations whose IsInline attribute is True, and these have already been processed.

The pseudocode for ProcessImplementations is as follows:

```
ProcessImplementations(){
    for each A in ImplementationCompileList{
        state = A.BuildState;
        if( A = Uncertain ){
            A.SetBuildState( Compiled );
        }
        else if( A = NeedToCompile ){
            value = Compile( A );
            if( value = = Done ){
                A.SetBuildState( Compiled );
            }
            else if( value = =Error ){
                A.SetBuildState( CompileError );
                PropagateError( A );
            }
        }
        else if(A = CompileError _ UncertainError ){
        }
    }
}
```

Compiler Which Supports Build Process

The compiler 42 is called via the Compile function, and these two may be used as synonyms. The compiler 42 processes the source text and identifies the names of possible external components. The compiler 42 next obtains a list of references to all components The compiler may eliminate references from the list using language specific knowledge such as component kinds. The compiler then calls the function called GetDeclaration for each external component identified in the text. The Compile function clears any existing errors on a component before invoking the compiler 42. This will clear any error messages from the Errors property and remove any references from the Project's ErrorList property.

Figure 9:
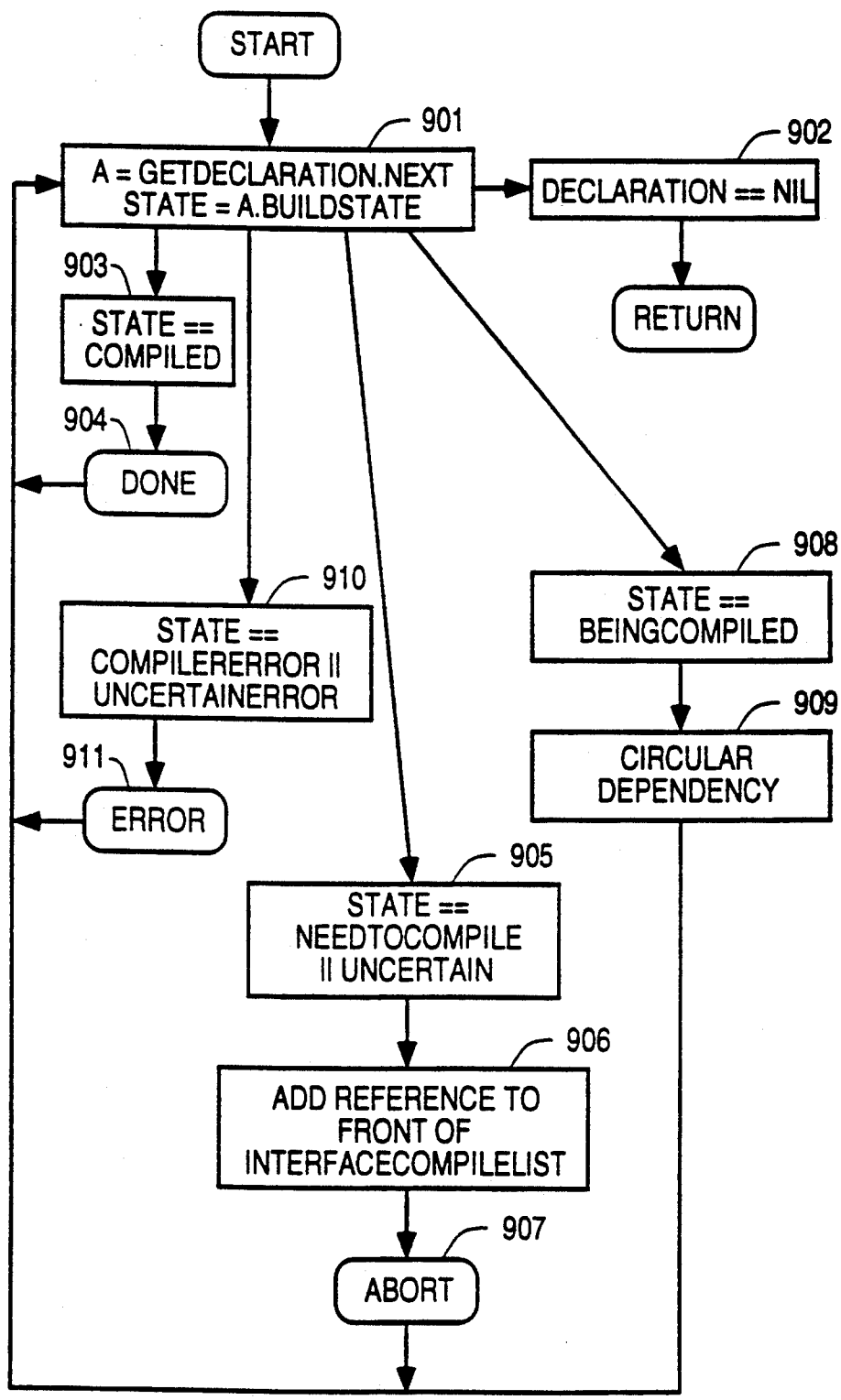
FIG. 9 is a flowchart showing the logic of the Get-Declarations function called by the compiler according to the invention.

The compiler first calls the GetDeclaration function, which is illustrated by the flowchart of FIG. 9. The GetDeclaration function returns one of the values Abort, Done, Circulardependency or Error and may additionally return the data of the Declaration. The process is entered at block 901 where each reference is examined for its BuildState. If there are no more references to process, as indicated by block 902, processing is complete and a return is made. If the BuildState of the component is Compiled, as indicated at block 903, the function returns Done at function block 904, and the stored Declaration data is also returned, before processing continues at block 901. If the BuildState of the component is NeedToCompile or Uncertain, as indicated at block 905, a reference corresponding to the component is added to the front of the InterfaceCompileList in function block 906 and the function returns Abort in function block 907 before processing continues at block 901. Declaration data is not returned in this case. If the BuildState of the component is BeingCompiled, as indicated by block 908, then the function returns Circulardependency at function block 909 before processing continues at block 901. Declaration data is not returned for this case either. If the BuildState of the component is CompileError or UncertainError, as indicated in block 910, then the function returns Error in function block 911 before processing continues at block 901. Again, declaration data is not returned.

The pseudocode for the GetDeclaration function is as

-continued

```
follows:
value GetDeclaration( A, Declaration ){
    Declaration = NIL;
    state = A.BuildState;
    if( state == Compiled ){
        Declaration = CurrentDeclaration();
        return( Done );
    }
    else if( state == NeedToCompile _ Uncertain ){
        InterfaceCompileList.AddToFront( A );
        return( Abort );
    }
    else if( state == BeingCompiled ){
        return( Circulardependency );
    }
    else if( state ==CompileError _ UncertainError ){
        return( Error );
    }
}
```

After calling GetDeclaration, the compiler continues as follows. If the value returned was Abort, the compiler must terminate processing and return the value Abort. An alternative implementation would be for the compiler to suspend compilation, to be restarted or abandoned after compiling the returned component. This would require the compiler to be reentrant but otherwise requires no essential change to the procedure as described. If the value returned was Compiled, the compiler can continue processing. If the Declaration is used, this will constitute a SourceReference dependency, and the compiler should keep track of both the dependency and its nature. If the value returned was Circulardependency or Error, then the compiler must terminate processing, call the SetError function on the component, and return the value Error. The compiler may optionally continue processing to possibly find more errors before terminating.

If the calls to GetDeclaration return Compiled, the compiler will continue processing the source text in a conventional manner. If any error is encountered in the processing, the compiler will call the SetError function on the component and return the value Error. If no errors are encountered, the compiler then returns the value Done. If the compiler has been processing an interface, then it will store the new value of the Declaration property.

Method for Processing Errors

Before the compiler is called to compile an Interface or Implementation, any existing Errors are cleared. This will ensure that all error messages are up to date. Because of the built-in dependency between Interfaces and Implementations and the fact that the errors are propagated, it is never possible to get compiler errors on both the Interface and the Implementation on the same build.

When the compiler encounters an error, it calls the function SetError which communicates information about the error, including the location of the error and a message describing the error, back to the erroneous component. This information is stored in the Errors property and the appropriate source property (Interface or Implementation) of the component. Also a reference is stored in a global error list maintained by the Project which allows convenient access to all errors.

The error will be propagated to any dependent component so that these components need not be compiled later, since it is known that these compiles will fail. Furthermore, the build will continue after errors are encountered and win correctly build as many components as possible that are not themselves explicitly in error or which depend on components with errors.

The SetError function takes the error message passed to it by the compiler 42 and creates an entry in the component's Errors property corresponding to the appropriate property (Interface or Implementation). It also creates an entry in the Project's ErrorList property corresponding to the error. The two entries created in this way share the same key so that they remain "linked". The function also typically records the position of the error in the program source using a "sticky marker" which remains attached to the same range of characters during later user editing.

If the compiler successfully completes processing of the source text, it will produce object code and pass that to the Linker function to incrementally link. Alternatively, the object code could be stored until the end of the build process and linked in a traditional fashion.

The compiler will now update the SourceReferences property of the component and the Clients properties of each SourceReference. For each reference to, say, component B in the SourceReferences property of, say, component A, there will need to be a corresponding reference (which has the same dependency information) to component A in the Clients property of component B.

The compiler will create a change describing the ways in which the Declaration has changed from its previous value. The compiler will call the function PropagateChange on the component passing it the calculated change. The compiler will then set the new value of the Declaration. The function PropagateChange matches the change against the dependency of each reference in the component's Client List. If the match indicates that the referenced component has been affected by the change and its BuildState is not CompileError or UncertainError, its BuildState is set to NeedToCompile.

It is possible for the compiler to use the SetError function to issue warning messages or suggestions of various forms. In this case, if only warning messages are returned, the Compile function should return Done. The warning messages will be added to the Errors property and references will be added to the Project's ErrorList property. However, otherwise the compile is treated as successful. The appropriate BuildState will be set to Compiled and no errors will be propagated. If only warnings or suggestions are issued, then the program will be completely and correctly built.

Process for Conditionally Compiling a Component

Figure 10A:
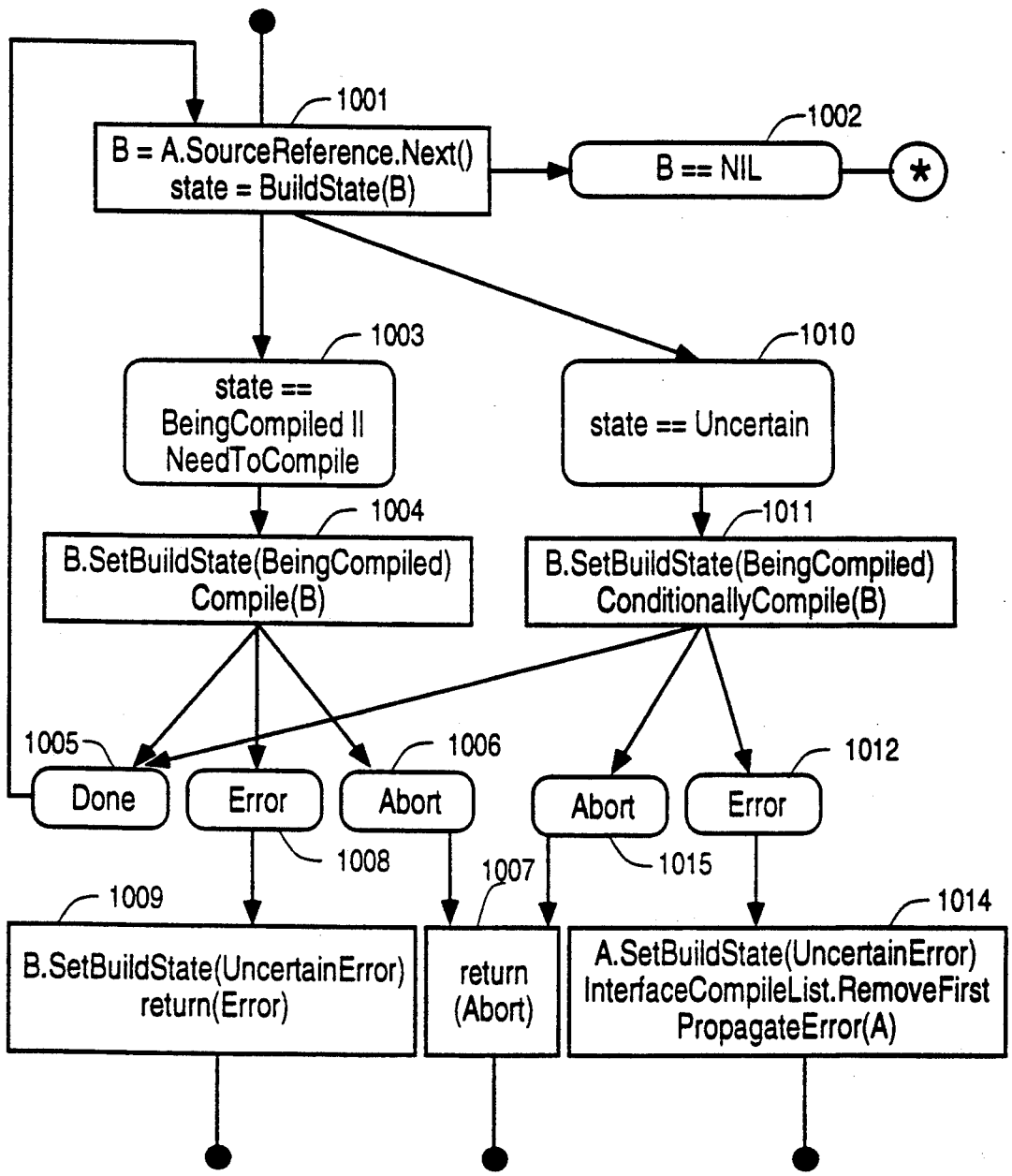
FIGS. 10A and 10B, taken together, are a flowchart showing the logic of the Conditionally Compile function.
Figure 10B:
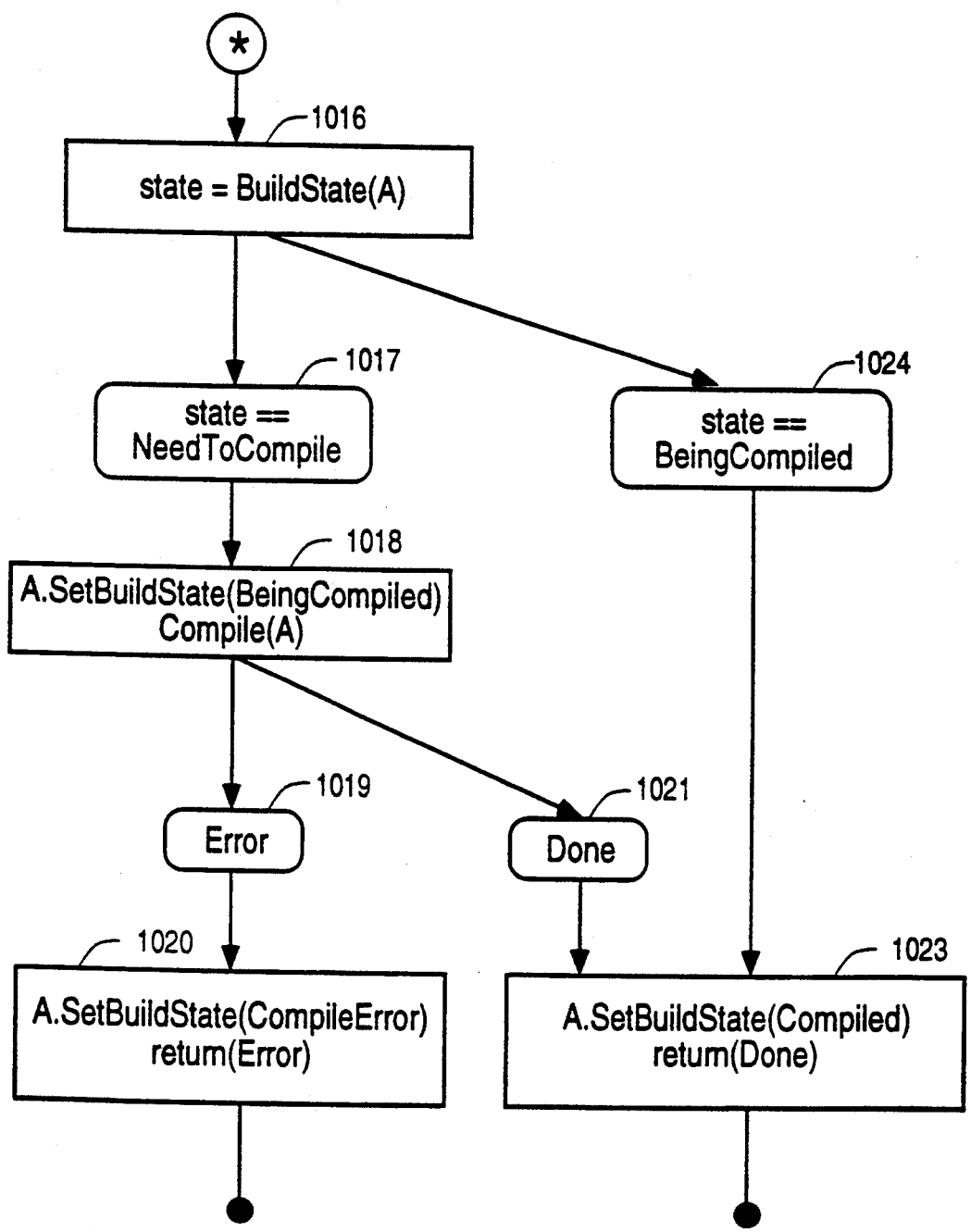

The flowchart for the function ConditionallyCompile is shown in FIGS. 10A and 10B, to which reference is now made. Each component B in a component A's SourceReferences is processed in block 1001. If all components B have been processed, as indicated by block 1002, then processing is complete as to the components B, and the process goes to FIG. 10B to compile component A. If the BuildState of component B is BeingCompiled or NeedToCompile, as indicated at block 1003, the BuildState of the component is set to BeingCompiled and the component is compiled in function block 1004. The Compile function may return one of the values Done, Abort or Error. If the value Done is returned in block 1005, processing continues in block 1001.

If the value returned is Abort in block 1006, the function is terminated and the Abort is returned in function block 1007. If the value returned is Error in block 1008, the original component's BuildState is set to UncertainError, the function is terminated, and Error is returned in function block 1009. If the BuildState of component B is Uncertain, as indicated at block 1010, then the BuildState is set to BeingCompiled and the component is conditionally compiled in function block 1011. Again, the ConditionallyCompile function may return one of the values Done, Abort or Error. If the value Done is returned in block 1005, processing continues in block 1001. If Error is returned in block 1012, the component's BuildState is set to UncertainError, the component A is removed from the InterfaceCompileList, and the PropagateError function is called in function block 1014 before the function is terminated. If Abort is returned in block 1015, Abort is returned in function block 1007 before the function is terminated.

Turning now to FIG. 10B, if all the reference's have been processed, then they all have the BuildStates Compiled. However, one of the SourceReferences may have propagated a change to the component during the processing to this point, and so its BuildState may now be either BeingCompiled or NeedToCompile. Therefore, the BuildState of component A is determined in block 1016. If the BuildState is NeedToCompile, as indicated at block 1017, then the BuildState is set to BeingCompiled and component A is compiled in function block 1018. The compiler can return either Error or Done. Note that Abort should never occur because all the SourceReferences are Compiled at this stage. If Error is returned in block 1019, then the BuildState is set to CompileError and Error is returned in function block 1020. If Done is returned in block 1021, then the BuildState is set to Compiled and Done is returned in function block 1023. If the BuildState of component A is BeingCompiled, as indicated at block 1024, then the BuildState is set to Compiled and Done is returned in function block 1023.

The pseudocode for the function ConditionallyCompile is as follows:

```
value ConditionallyCompile( A ){
    for each B in A.SourceReference{
        state = B.BuildState;
        if( state == NeedToCompile _ BeingCompiled ){
            value = Compile( B );
            if( value == Done ){
                continue;
            }
            else if( value == Abort ){
                return( Abort );
            }
            else if(value == Error ){
                A.SetBuildState( UncertainError );
                return( Error );
            }
        }
        else if( state == Uncertain );
            A.SetBuildState( BeingCompiled );
            value = ConditionallyCompile( A );
            if( value == Done ){
                continue;
            }
            else if( value == Abort ){
                return( Abort );
            }
            else if( value == Error ){
                A.SetBuildState( UncertainError );
                InterfaceCompileList.Remove( A );
                PropagateError( A );
            }
```

```
        }
    }
    state = A.BuildState;
    if( state == NeedToCompile ){
        A.SetBuildState( Being Compiled ){
        value = Compile( A );
        if( value == Done ){
            A.SetBuildState( Compiled );
            return( Done );
        }
        else if( value == Error ){
            A.SetBuildState( CompileError );
            return( Error );
        }
    }
    A.SetBuildState( Compiled );
    return( Done );
}
```

Method for Post Processing Errors

The method for post processing errors is the fourth stage of the Build process. If any errors occurred during the build, then the function PostProcessErrors is called at the end of the build. For each reference in the InternalErrorList, if the reference's BuildState is CompileError, the BuildState is changed to NeedToCompile. If the reference's BuildState is UncertainError, the BuildState is changed to Compiled.

When all the references on the InternalErrorList have been processed, the list is cleared of all entries. As a convenience to the programmer, if the Projects ErrorList contains any entries, a window or the Browser is opened on the Project's ErrorList.

The pseudocode for the PostProcessErrors function is as follows:

```
PostProcessErrors(){
    for each A in InternalErrorList{
        state = A.BuildState;
        if( state == CompileError ){
            A.SetBuildState( NeedToCompile );
        }
        else if( state == UncertainError ){
            A.SetBuildState( Compiled );
        }
    }
    InternalErrorList.ClearAll();
    if( ErrorList.Count !=0 ){
        OpenErrorWindow();
    {
{
```

Using HOOPS

Figure 11:
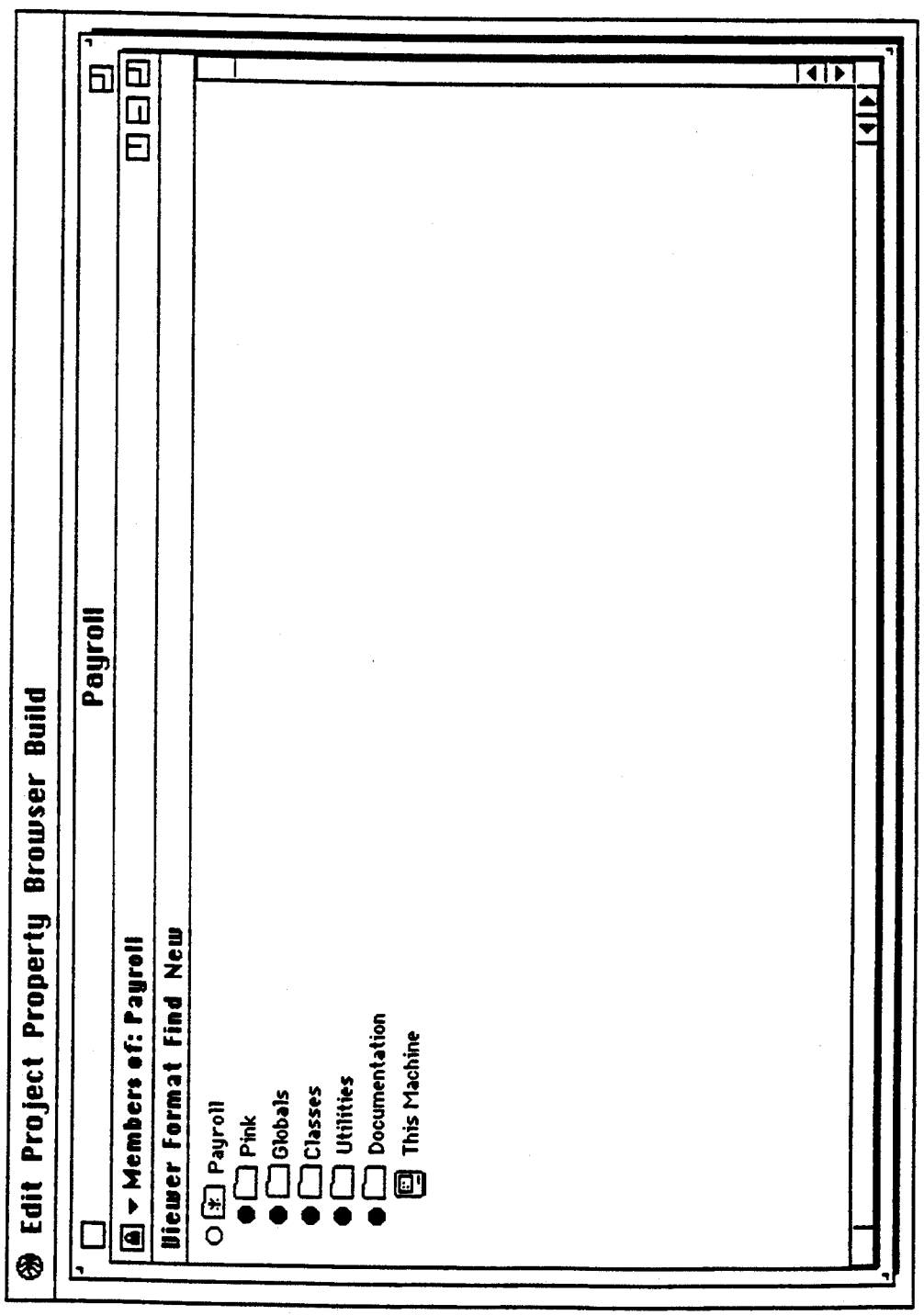
FIG. 11 is a pictorial representation of a computer screen showing a typical members viewer when the using the invention.

The Human Oriented Object Programming System (HOOPS) according to the invention can be started on the computer by entering either a project name or an existing project name, depending on whether a new program is to be built or an existing program is to be edited. When HOOPS is started, a window is opened and an initial screen similar to the one shown in FIG. 11 is displayed. The initial window that HOOPS opens displays the Members property of the Project component and its immediate members. Although it initially only displays the immediate members, the same window is used to display every component starting at the project component. In the example shown in FIG. 11, a Project called "Payroll" has been imported.

Figure 12:
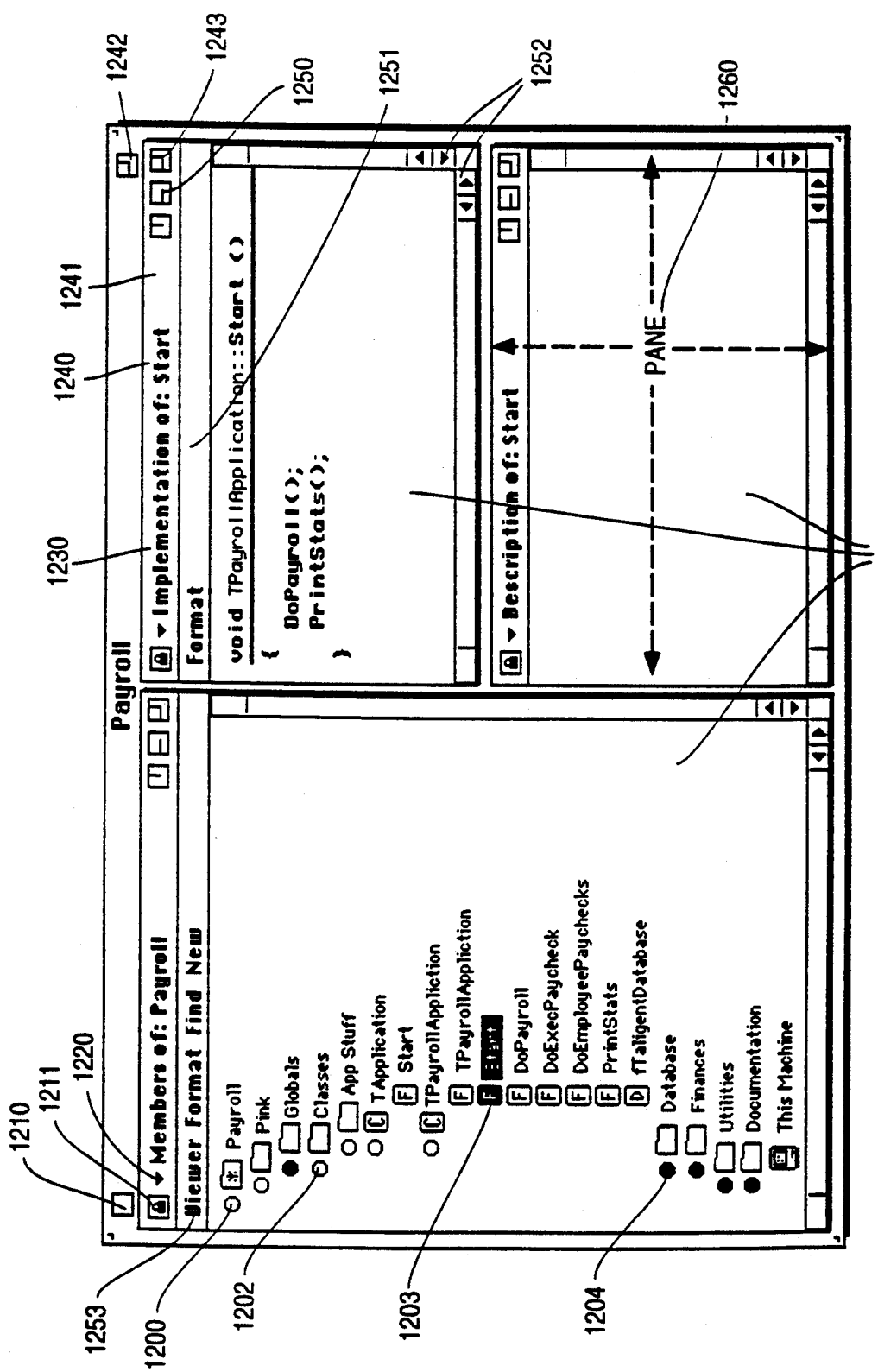
FIG. 12 is a pictorial representation of a computer screen showing a browser according to the invention.
Figure 13:
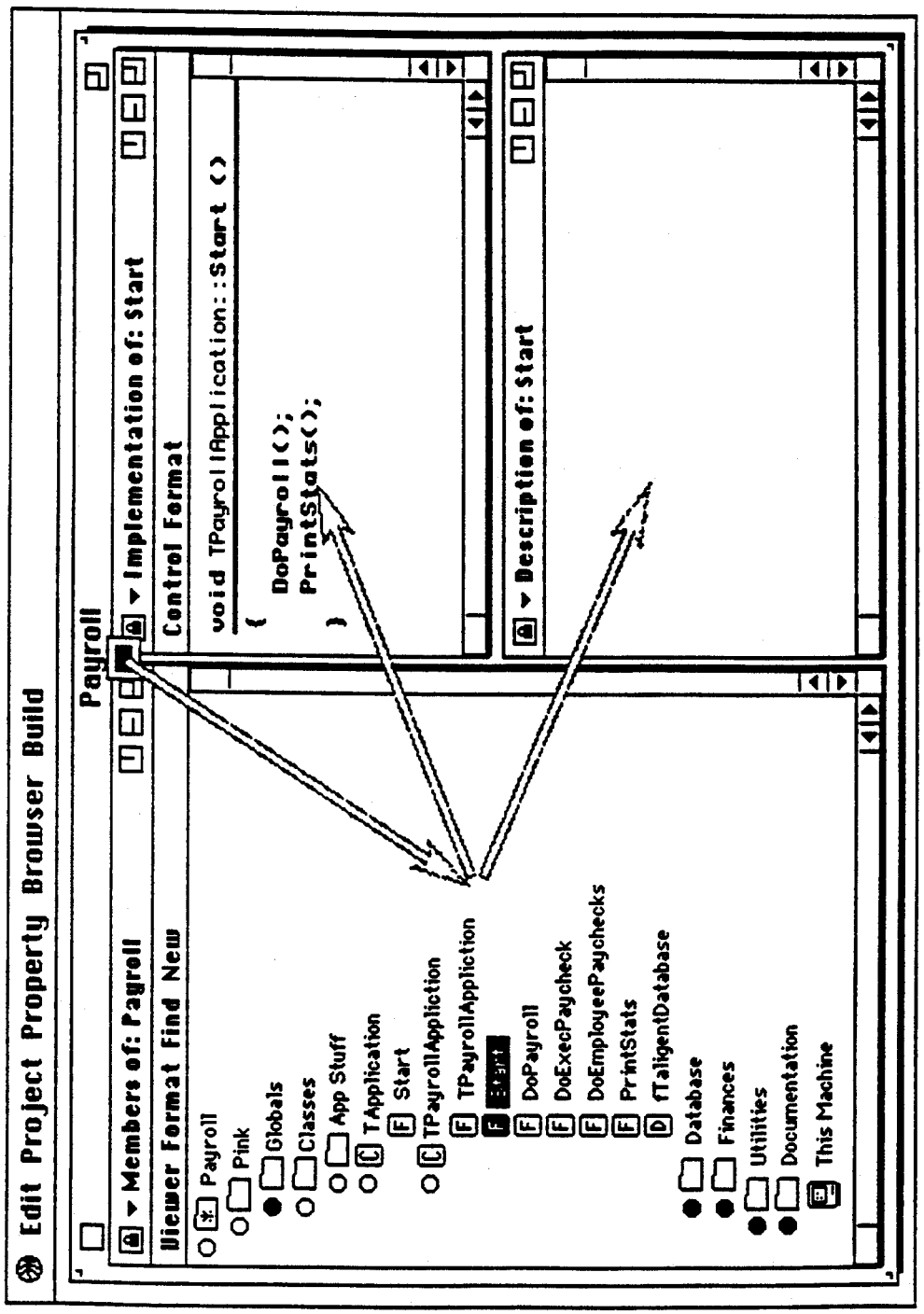

Every window in HOOPS is a browser. Browsers are temporary viewing and editing tools for looking at information in the Project. They can be deleted at any time by clicking on the close icon in the window. Any changes made to the Project while in the browser are automatically saved. A browser has an input component that is specified when it is opened. A property of the input component is displayed in a pane, and each pane displays one property viewer or is blank, as shown in FIG. 12. New panes are added to a browser by choosing one of the split icons in the upper right corner of a pane. When a new pane is created, default wiring is created from the pane being split to the new pane. Wiring is the logical relationship between a pane. A pane can have zero or one wire input and zero or more wires as output, but wiring cannot form a loop. When a component is selected in a pane, the selection is converted into a reference to a component in the project and becomes a new input to the destination of any wires emanating from that pane. The wiring can be turned on by choosing Turn on Wiring from the Browser menu selected from the menu bar, resulting in the display shown in FIG. 13. Using this display, it is possible to change the wiring between two panes by clicking down with the mouse on the new input location and dragging to the target pane.

Figure 14:
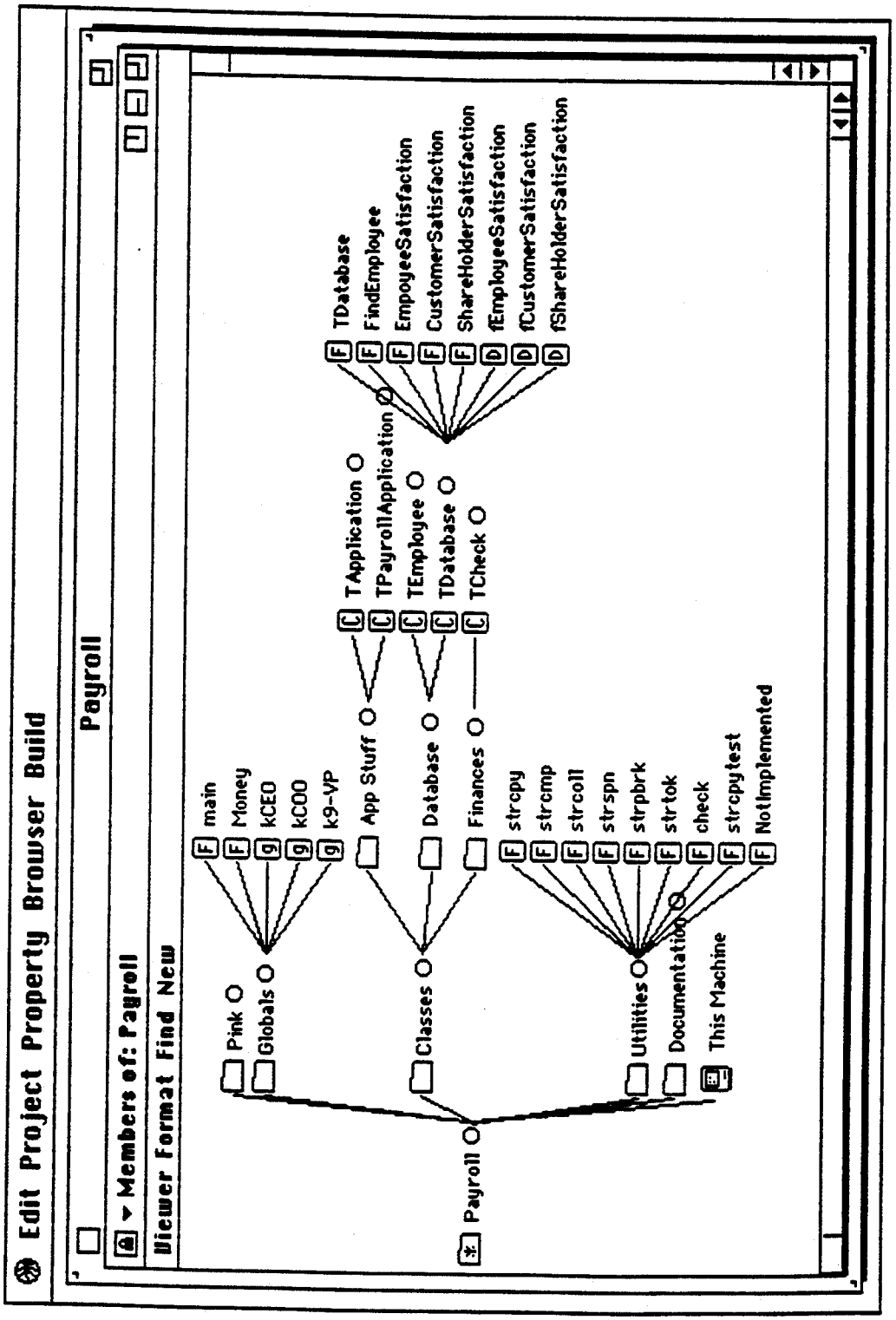
FIG. 14 is a pictorial representation of a computer screen showing a partially expanded project in a tree viewer.

In many viewers, such as Members, Clients and References, components can be distinguished by their names and their icons, which differ by component kind. In other viewers, a component's name simply appears in the text, such as in Source or Documentation. The component hierarchy can be browsed by expanding and collapsing container components in the Members property viewer, producing a Tree view, an example of which is shown in FIG. 14. One level of a component's subtree can be expanded or collapsed by clicking the component's circular toggle switch. When a component is selected in a viewer, either by clicking on its icon if it has one or by selecting its name in a text display, the Property menu in the global menu bar is adjusted to list the properties for that type of component. Any property of any component can be viewed by selecting the component in a viewer and then choosing a property from the Property menu. This opens a new browser containing a single viewer which displays the chosen property of the selected component.

Components are created from within either a Members or Interface viewer by specifying where the new component is to be created, and the kind of component it will be. The location of the new component is specified by either selecting an existing component or by placing an insertion point between components. The kind of component created is determined by which menu item is selected from the New viewer menu. All editing is automatically stored. Only changed components, and their clients affected by the change, are compiled. The recompiled components can be viewed by choosing the Show Components Built menu item from the Build menu. To see the components changed since the last build, the Show Components Changed from the Build menu is chosen. A program is compiled, and linked, by choosing Build from the Build menu. The Build & Run menu also runs the program.

Figure 15:
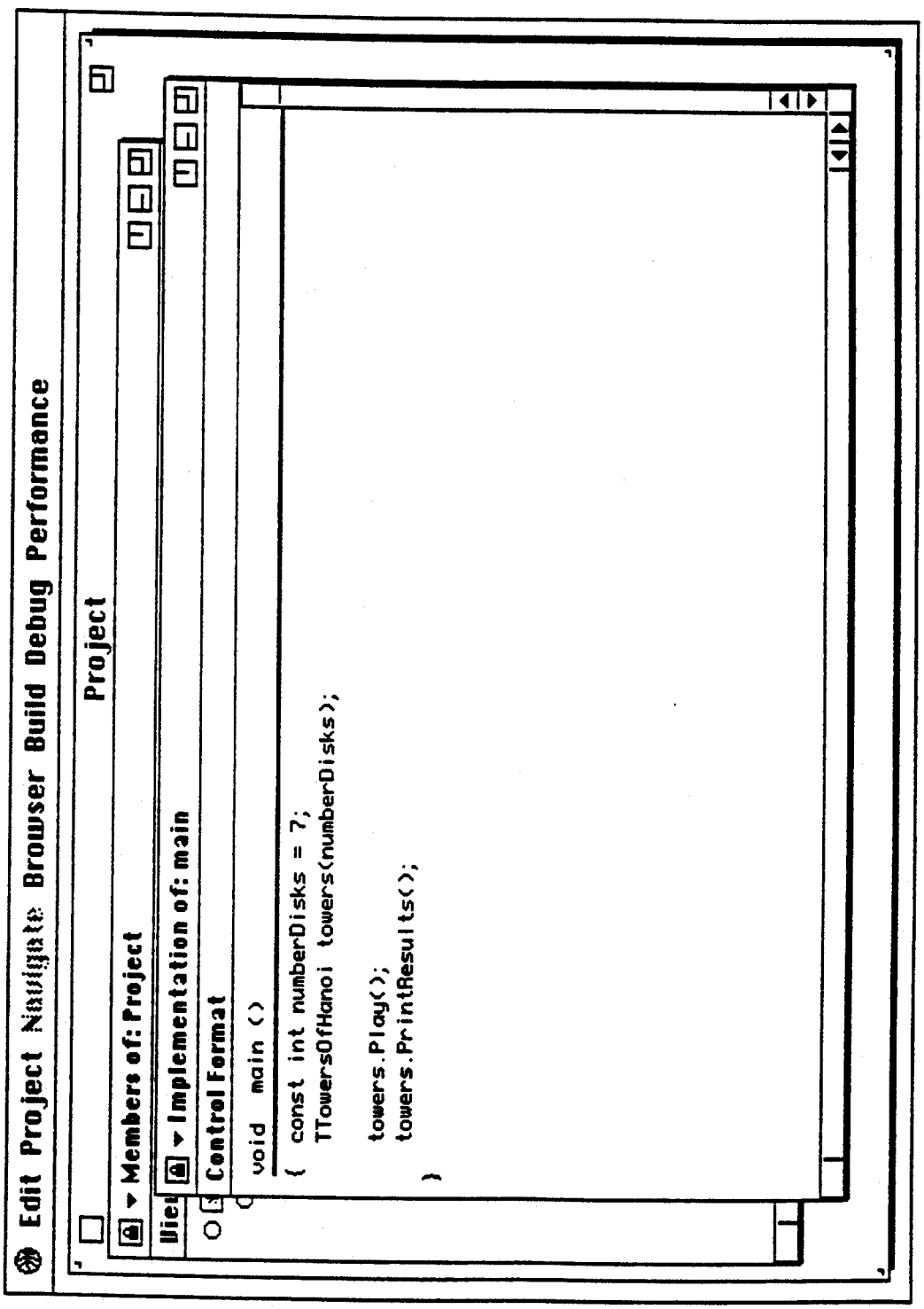
FIGS. 15 to 18 illustrate some of the screens displayed in the process of editing a component.
Figure 16:
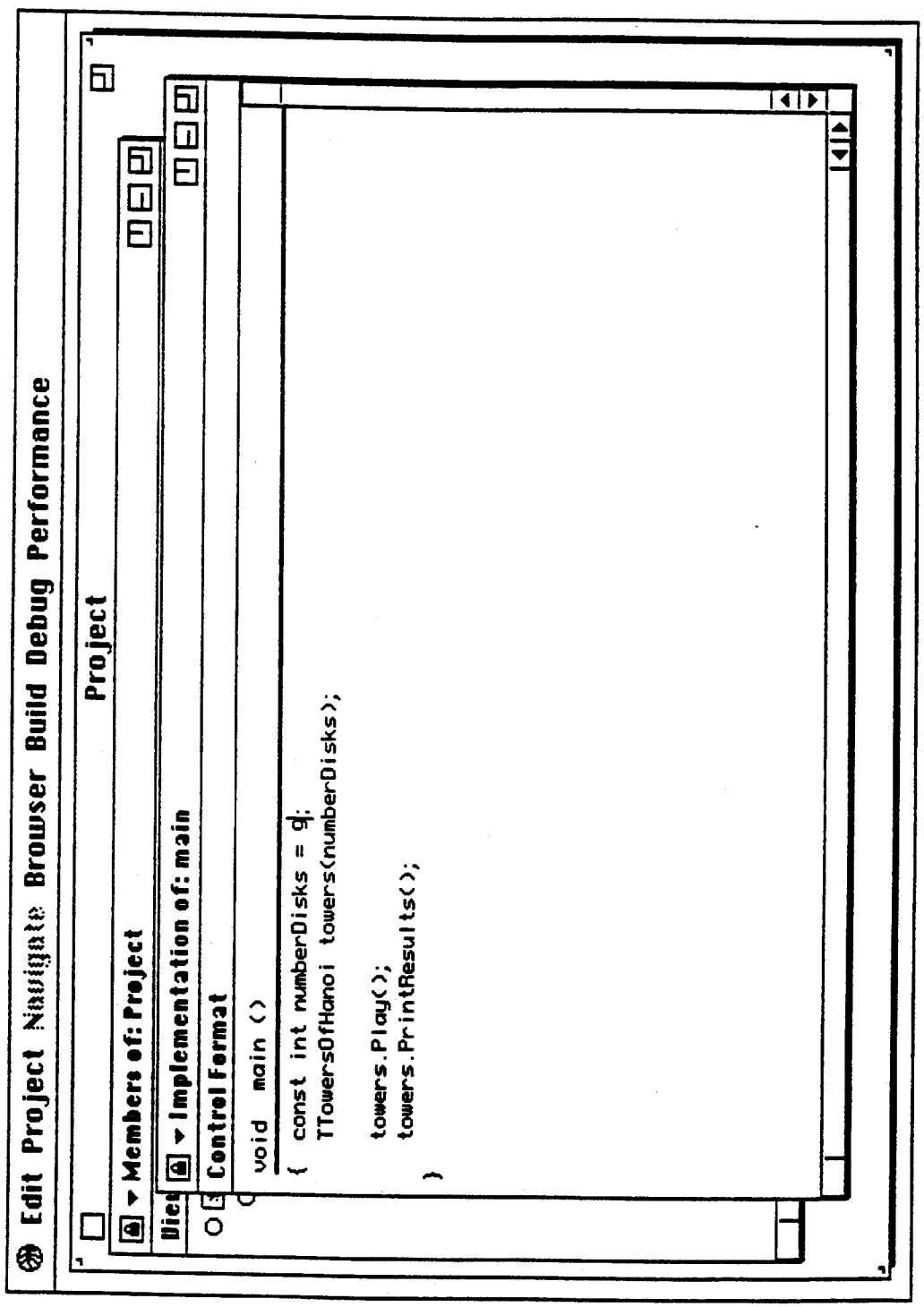
Figure 17:
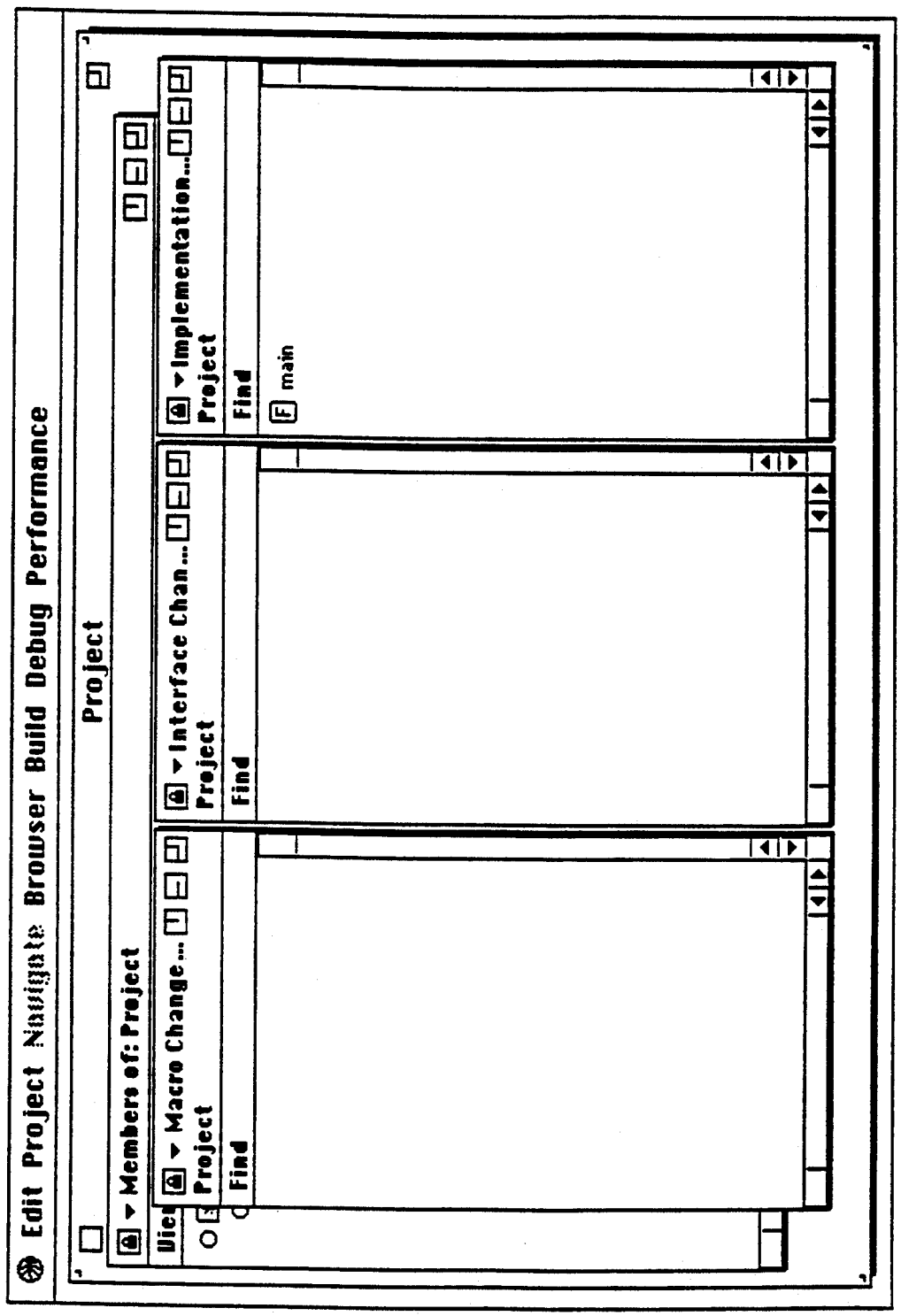
Figure 18:
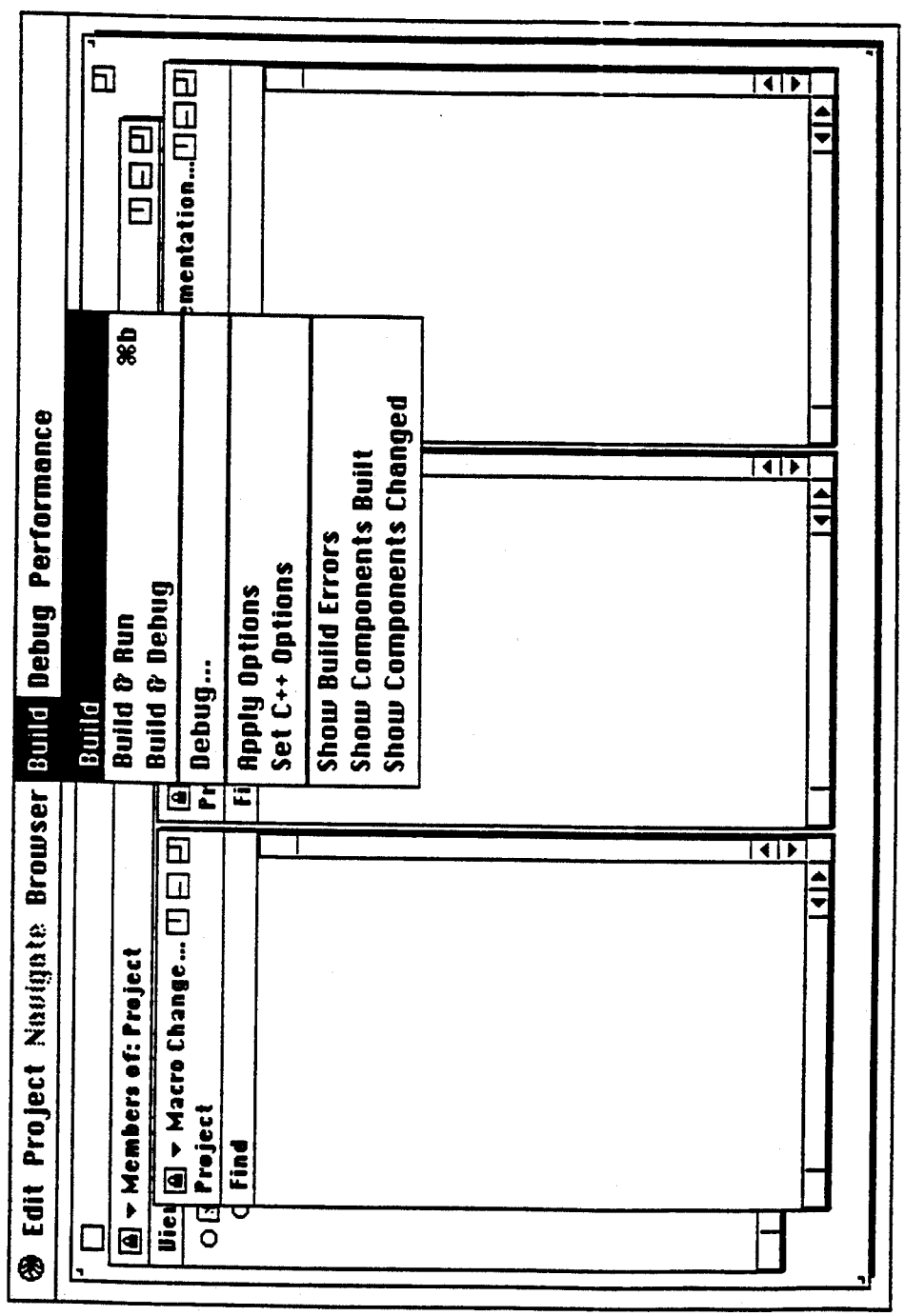

FIGS. 15 to 18 illustrated some of the screens displayed in the process of editing a component. FIG. 15 shows the display of the source code of an Implementation of a function called "main". In FIG. 16, the function "main" has been edited by changing numberdisks from "7" to "9". If the programmer now chooses Show Components Changed from the Build menu shown in FIG. 17, a browser like that shown in FIG. 18 appears. In the "Implementation Changes" viewer (on the right), the function "main" is displayed indicating that it has been changed.

Object Oriented Linking

This description lists the important features of the HOOPS linker, then it provides background on the runtime environment of a preferred embodiment, and the HOOPS database to provide the context in which linking occurs. Finally, a discussion of component linkage, and the interaction of components with the HOOPS compiler, the HOOPS database, and the system loader is provided with reference to a preferred embodiment.

Linker Features

Linking occurs during the compilation process. There is no extra linking pass.

During a build, only newly compiled functions and data are re-linked.

During incremental development, some shared library space is traded for speed.

The compiler interacts with components and properties to produce all object code and other linking information.

When a program is ready for release, a "publish" step will remove extra space and information used during incremental development, and separate the application from HOOPS.

A "QuickPublish" step will be available for quickly separating the application from HOOPS for sharing with others, or moving to another machine.

The linker is extensible because the compiler may specify new fixups that the linker doesn't normally handle.

A suspended program may be modified and then resume execution without being reloaded. (Some changes will require a reload.

Background

The linker operates inside HOOPS, and creates files that are used by the loader. To understand the linker strategy, it is important to understand the unique aspects of both the runtime system and HOOPS.

An executable file interacts with the runtime much differently than in other runtime systems. Normally, a loader program must understand the executable file format. The executable file has known fields that describe various aspects of the program such as the amount of memory needed, the address of main, any relocation information if that is needed at load time, and any debugger information that is packaged in the executable. In a runtime of a preferred embodiment, the loader interacts with the executable file through an abstract TLoadModule class interface. The TLoadModule provides protocols for all the loading operations. For example, operations such as specifying memory requirements, building meta data information, and linking with other shared libraries are all provided by methods of TLoadModule. With this approach, there can be many different ways in which a load module can respond to the loading requests.

The runtime definition provides shared libraries, and allows for cross-library calls to be resolved at load time. Since libraries may be loaded at any memory location, all code must be either position independent, or must be patched at load time. In addition to position independent code, calls to other shared libraries must be resolved at load time. This is because the static linker does not know what the location, or the relative offset, of the external library will be in memory.

Figure 19:
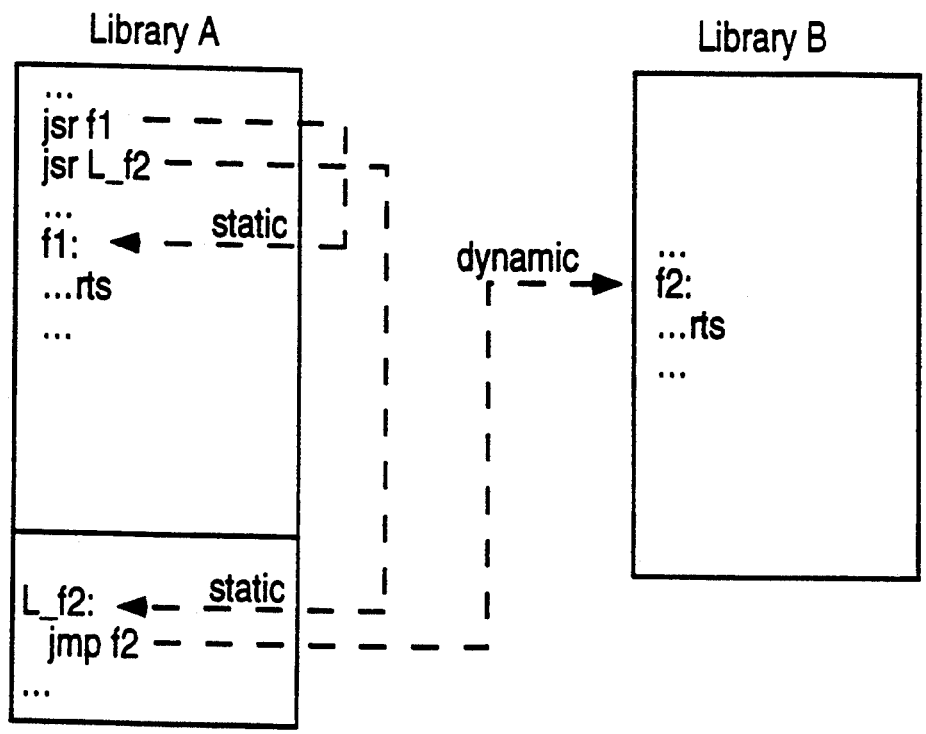
FIG. 19 illustrates an internal and cross-library call in accordance with a preferred embodiment.

While each TLoadModule class may implement cross-library calls in many different ways, the standard method is to jump through a linkage area that is patched at load time. The linkage area serves as an indirect jump table between libraries. An external call will JSR to the linkage area, and the linkage area will then JMP to the called function. Internal calls can JSR directly to the called function. An example of an internal and cross-library call is shown in FIG. 19 and described below.

The call to f1() 1900 is an internal call, so the JSR goes directly to f1() 1910. The call to f2() 1920 is a cross-library call; therefore, the call goes to the external linkage area 1930 that is patched at load time.

The HOOPS environment also provides a unique context for the linker. A program is represented as a collection of components. Each component has an associated set of properties. During the compilation of each component, the compiler will generate and store properties applicable to that component. The HOOPS build process orders the building of components so that all interfaces (declarations) are compiled before implementations (definitions).

A HOOPS project may consist of several library components. All source components are members of one of these library components. Each library component represents a shared library build.

Overview

To support incremental linking, and allow a final application to be as small and fast as possible, two different types of load modules are created. During development, HOOPS generates and modifies a TIncrementalLoadModule. There is a second load file, TStandardLoadModule, that is created when publishing applications.

A preferred embodiment discloses an approach for building and updating code during development. Converting a TIncrementalLoadModule into a TStandardLoadModule involves an extra "publish" step. This step will be much like a normal link step, in that each function or data item will be relocated and patched. However, external references are not resolved until load time.

Compiler Interaction

As the compiler generates code for a component, it passes the code to the object code property with a set of fixups that are used to patch the object code. Each compiled component has its object code property filled. The compiler uses an "object group" model. That is, a component can be made up of multiple types of object code. For example, a function could also have a private static data area associated with it, along with a destructor sequence for that static data area. A static data item could have a constructor and destructor sequence associated with it to initialize it at runtime.

For example, suppose the following component was compiled:

TFoo::Print()
{

-continued

```
static int timesCalled = 0;
cout << "Hello world:" << timesCalled << " n";
timesCalled++;
}
```

The compiler will generate two pieces of object code and associate them with the component TFoo::Print. There will be the object code for the function, and 4 bytes of private data for the static variable timesCalled. This might look something like the following:

| Object code Property of TFoo::Print - code: | | |
|---|---|---|
| 0x0000: | LINK | A6,#0 |
| 0x0004: | MOVE.L | A5,-(A7) |
| 0x0006: | PEA | L1 |
| 0x000A: | MOVE.L | <timesCalled>,-(A7) |
| 0x000E: | PEA | L2 |
| 0x0012: | MOVE.L | cout,-(A7) |
| 0x0016: | BSR | <operator<<(char*)> |
| 0x001C: | ADDQ.L | #8,A7 |
| 0x001E: | MOVE.L | D0,-(A7) |
| 0x0020: | BSR | <operator<<(int)> |
| 0x0026: | ADDQ.L | #8,A7 |
| 0x0028: | MOVE.L | D0,-(A7) |
| 0x002A: | BSR | <operator(char*)> |
| 0x0030: | ADDQ.L | #8,A7 |
| 0x0032: | ADDQ.L | #1,<timesCalled> |
| 0x0034: | UNLK | A6 |
| 0x0036: | RTS | |
| L1: | DB | " n" |
| L2: | DB | "Hello world:" |

| Object code property of TFoo::Print - data: | |
|---|---|
| 00000000: | 0000 0000 |

Along with the object code, the compiler will specify different fixups that must be applied as the code is relocated. These might look something like:
reference to timesCalled @ offset 0×0c
reference to count @ offset 0×14
reference to ostream::operator<<(const char *) @ offset 0×18
reference to ostream::operator<<(int) @ offset 0×22
reference to ostream::operator<<(const char *) @ offset 0×2c
reference to timesCalled @ offset 0×34

Notice that the fixups may specify references to the other pieces of objects associated with this same component (the private static variable timescalled), or to other components (such as count).

When the compiler has completely specified the full set of objects and fixups associated with a component, the object code property relocates all of its pieces, and links itself at the same time. There is no second link pass performed after all the components are compiled. As each component is compiled, it is also fully linked.

Fixup Lists

Figure 20:
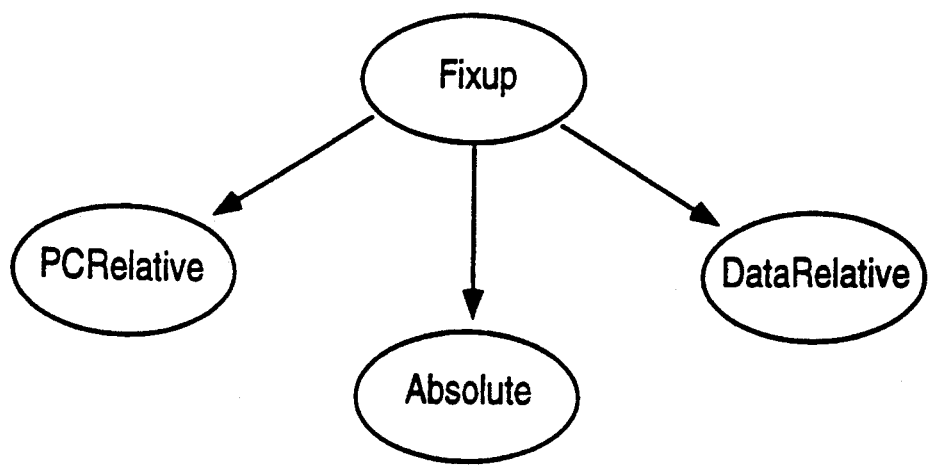
FIG. 20 illustrates a set of fixup classes in accordance with a preferred embodiment.

Linking is essentially a matter of iterating through the list of fixups and patching the code in an appropriate manner. Different types of fixups are specified through a class hierarchy, with each fixup knowing how to calculate the patch value. For example, a pc-relative fixup knows that it must calculate the difference between the address of its location, and the component which it references. An absolute fixup knows that it must delay calculations until load time. While the linker specifies a set of fixup classes, new compilers may specify new types of fixups. FIG. 20 illustrates a set of fixup classes in accordance with a preferred embodiment.

Address Calculation

The main problem with linking each component as it is compiled is that some components it references may have not yet been compiled.

Each source component is a member of exactly one library component. Associated with each library component is a load module property. The load module property works as the clearing house for all components that belong to the shared library. As a fixup prepares to calculate a patch value, it queries the load module property for the address of a component. The load module property checks to see if the component has been compiled. If it has, then it returns the address of the component. However, if the component has not yet been compiled, the load module property performs two actions depending on the type of the component.

If the type of the component is a data component, then it just returns a constant address. If the type of the component is a function component, then it creates a linkage area for that function, and returns the address of the linkage area.

Object Placement

As mentioned before, as each component is compiled, it is allocated a position in the shared library. As this is done, some extra work must be done so that all references are consistent.

If the component is a data component, all its clients are notified of the position. Some clients may have initially been linked with bogus addresses, so this process cleans up all the clients and provides them with the right address. If the component is a function component, then the linkage area for that function is updated with the new address. Notice that this two style approach provides indirect access to functions, and direct access to data.

In addition, extra space is allocated so that future updates of the object code has a higher probability of being able to use the same area. 12% extra is provided for functions and 25% extra is provided for large data objects.

Linkage Area

Figure 21:
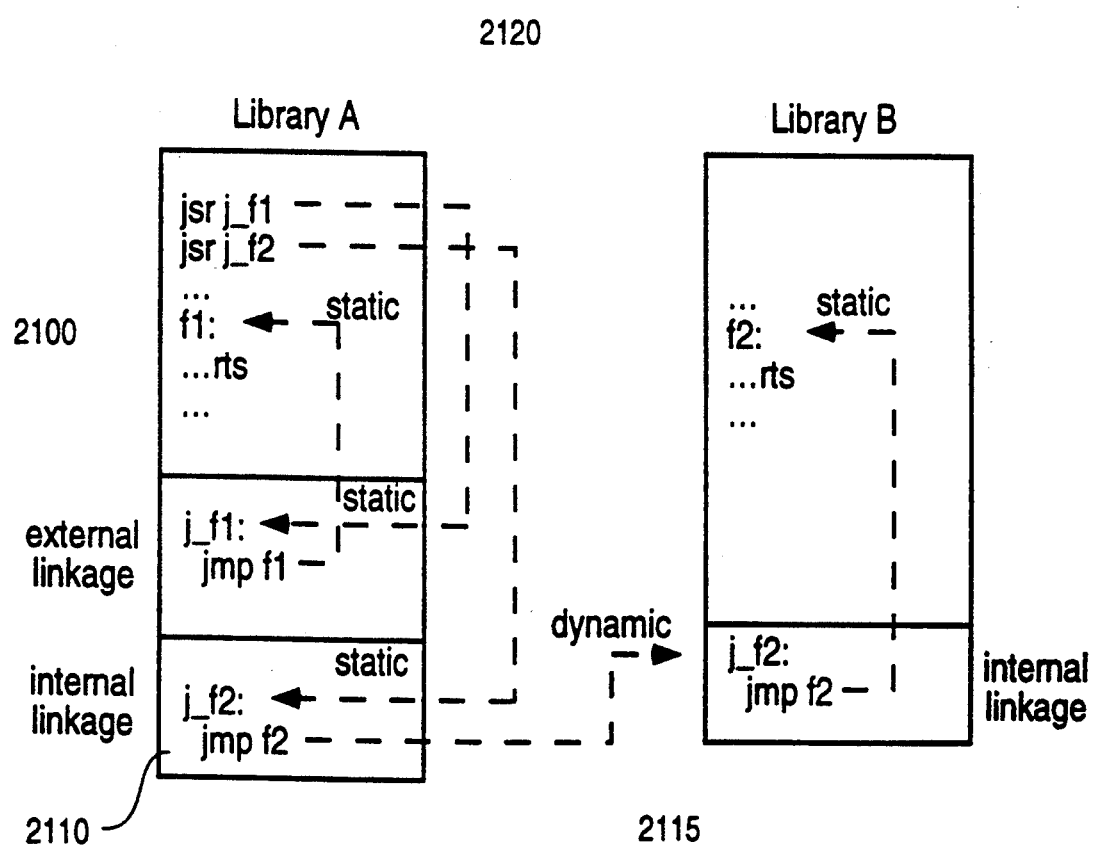
FIG. 21 illustrates a linkage area in accordance with a preferred embodiment.

As mentioned above, when the load module property is asked for the address of a function, it will give the address of the linkage area. This means that every function reference is indirect. FIG. 21 illustrates a linkage area in accordance with a preferred embodiment.

Notice that not only the internal library calls pass indirectly through the internal linkage area, but cross-library calls to functions go indirectly through a library's internal linkage area (i.e.: the call to f2 in Library B, 2100, 2110, 2115, 2120). This must be done so that f2 may change position without updating both its internal and external clients, and also for consistency so that items such as function pointers work correctly. In addition, all virtual table function pointers will also point to the internal linkage area.

Any functions that are referenced, but not defined, will point to a common Unimplemented() function. Having all uncompiled functions point to Unimplemented(), facilitates the load and run partial applications without forcing the programmer to create stub functions.

Another benefit of having the internal linkage area is that it provides a bottleneck to all functions. During development, the internal linkage area can be useful for activities that require function tracing such as debugging or performance monitoring.

Incremental Linking

The previous discussion has laid the foundation for a detailed discussion of incremental linking. When a component is recompiled, the new component size is compared to the old component size to determine if the new component fits in the current location. If it will, then it is stored there, and it is iteratated through its fixup list. Linking is then complete.

If the object code for the new component must be relocated, then the old space is marked as garbage, and the new object code is relocated to a new area. Then the fixup list is iterated through. If the component is a function, the linkage entry is updated. Linking is then complete. However, if the component is a data item, then the component must iterate over the list of clients and update their references to this component. Linking is then complete for the data.

Notice that the initial link and incremental link follow the exact same steps. The only extra step done in incremental updates is handling the case when a data item must change location.

Object Code Storage

The object code and load module property are normal component properties, and as such, are stored like all other properties in the HOOPS database. However, the object code property describes the object code, but does not contain the actual bits. The actual bits are stored in segments owned by the load module property. The load module property maintains four different segments. These segments include: code, uninitialized data, initialized data, and linkage.

Figure 22:
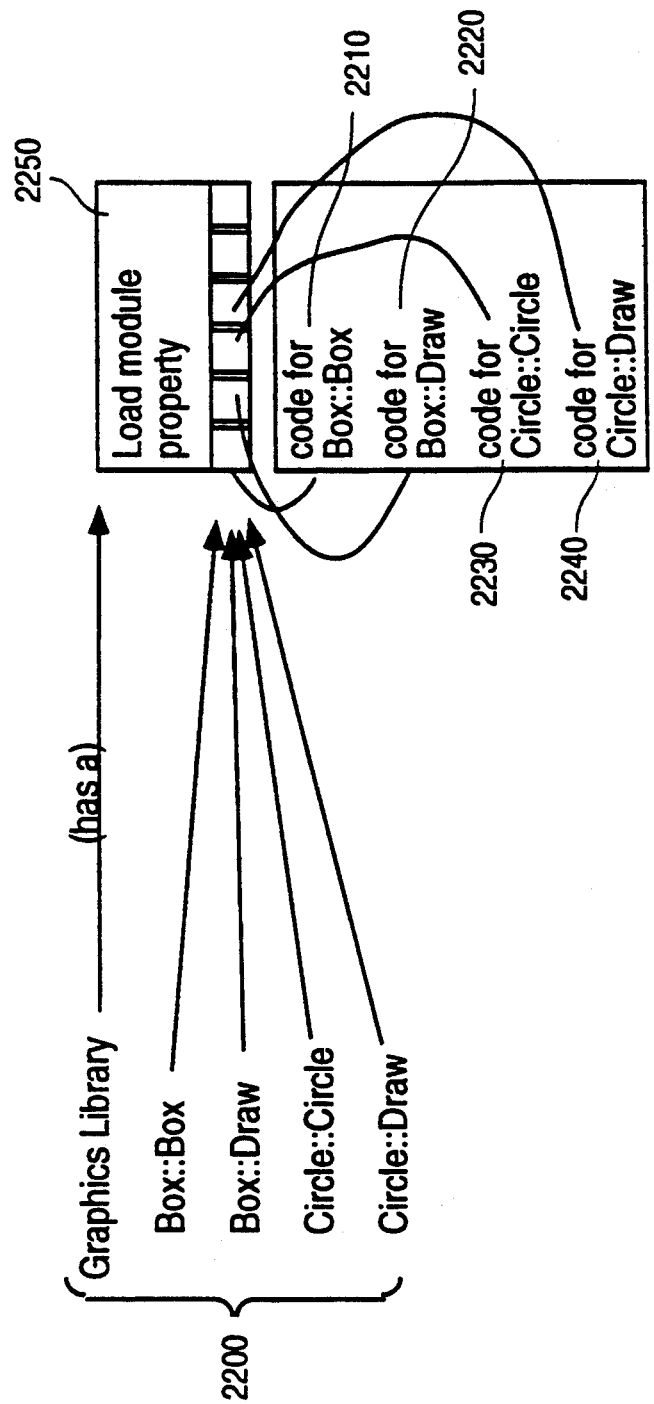
FIG. 22 illustrates the storage of object code in accordance with a preferred embodiment.

FIG. 22 illustrates the storage of object code in accordance with a preferred embodiment. Each of the graphic objects 2200 has an associated load module property 2250 containing the individual object code associated with the graphic objects 2210, 2220, 2230 and 2240. Since all code is linked as it is compiled, and support is provided for changing and incremental building, the load module property maintains a map of all the objects allocated in each segment. It also tries to keep extra space available for growth. This extra space wastes some virtual memory space, but does not occupy backing store or real memory. If during the process of repeatedly changing and building an application, the extra space is exhausted, additional space will be allocated, affected segments must be relocated, and all references into and out of that segment must be updated.

Figure 23:
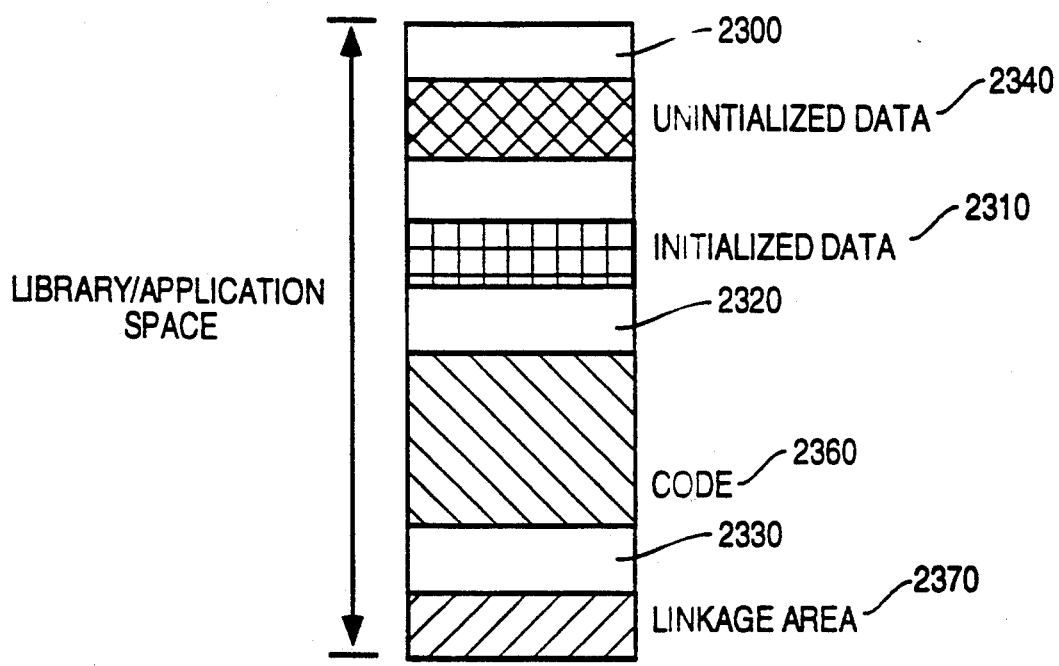
FIG. 23 illustrates a loaded library in accordance with a preferred embodiment.

FIG. 23 illustrates a loaded library in accordance with a preferred embodiment. The white sections 2300, 2310, 2320 and 2330 represent free space. Four sections are provided for uninitialized data 2340, initialized data 2350, code 2360 and a linkage area 2370. In HOOPS, the segments have no spatial relationship. Linking uses what will be the loaded relationship, not the relationship that they might have within HOOPS itself.

Loading

To run a program, the loader must be given a streamed TLoadModule class. During program building, a streamed TLoadModule class is created. When loaded, it loads the segments created in HOOPS. The segments are shared between the loaded application and HOOPS. This provides two benefits: first, it greatly reduces the amount of copying that must be done, and second it allows for incremental updates while the program is loaded.

Figure 24:
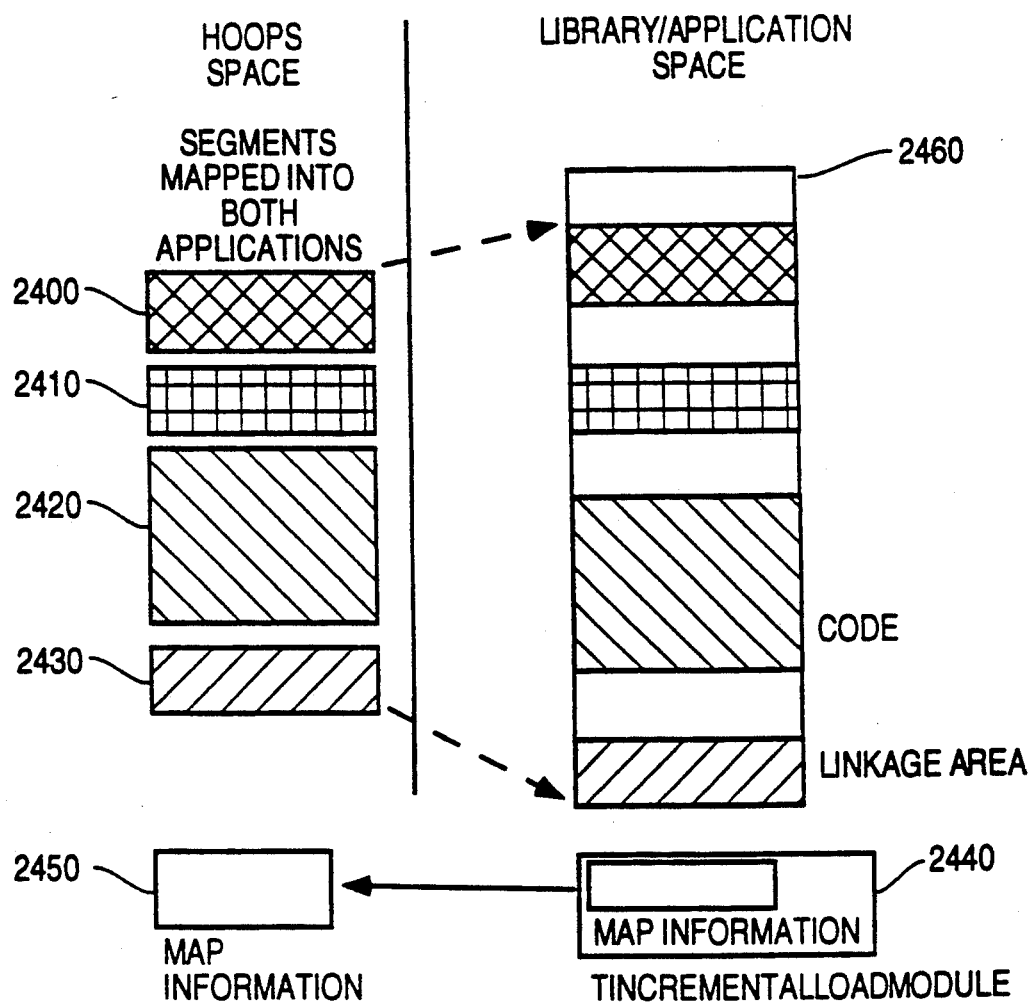
FIG. 24 is a memory map of a load module in accordance with a preferred embodiment.

Streams must be written from start to finish, since the loader requires a streamed TLoadModule class, the TIncrementalLoadModule attempts to reduce the amount of information streamed. This means that for most changes in a program, the TIncrementalLoadModule will not have to be restreamed. The TIncrementalLoadModule gets all the mapping information from HOOPS through the use of a shared heap. Otherwise, any change in data location, or function size would require a new TIncrementalLoadModule to be built and streamed. FIG. 24 is a memory map of a load module in accordance with a preferred embodiment.

Incremental Updates

Incremental linking facilitates modification of a loaded library without removing it from execution. This requires changes made in HOOPS to be reflected in the address space of the running application. This will be handled by loading the library as a shared segment. Any modifications made on the HOOPS side will be reflected on the running application side. Remember that on the HOOPS side, the segment is interpreted as a portion of the HOOPS database, on the application side, it is just a segment that contains object code.

The model for active program modification is as follows. The debugger first stops execution, modified functions are compiled, and located at different locations even if they fit in their current location, the internal linkage area is updated, and the program is continued. If a modified function was active on the stack, the old version will execute until the next invocation of that function. An alternative is to kill the program if active functions are modified.

Publishing a Program

When an application is published, the linker will copy all object code to a file outside of the database. As the segments are copied to an external file, the linker will relocate and patch an the functions. In addition, all internal calls will become direct calls, and the internal linkage area will be removed. Besides just relocating and linking the object code, the linker must include the meta data necessary for virtual table creation. Notice that this step is essentially a relink, the compiler is not involved.

A second style of publishing is also required, the style is referred to as a quick publish. A quick publish copies the required segments from the database to an external file. The purpose of this second publish is to support quick turn-around for cross development, or shared work.

| Implementation details Class Deinintions |  |
|---|---|
| enum EObjectKind | {kCode,kData, |
| kStaticCtor, kStaticDtor }; | |
| class TObjectProperty : public TProperty { | |
| public: | |
| TObjectProperty(); | |
| virtual | ~TObjectProperty(); |
| // Compiler Interface | |
| virtual void | WriteBits(EObjectKind |
| whichOne, LinkSize length, | |
| | void* theBits, unsigned short |
| alignment); | |
| virtual void | AdoptFixup(EObjectKind |
| whichOne, TFixup* the Fixup); | |
| // Getting/Setting | |
| | void* |
| CopyBits(EObjectKind whichOne) const; | |
| LinkOffset | GetOffset(EObjectKind |
| whichOne) const; | |
| LinkSize | |
| GetLength(EObjectKind whichOne) const; | |
| ELinkSegment | |
| GetLinkSegment(EObjectKind whichOne) const; | |
| Boolean | |
| Contains(EObjectKind whichOne) const; | |
| virtual EObjectKind | GetPublicKind() const = 0; |
| // Linking | |
| virtual void | GetLocation(EObjectKind |
| whichOne, TLocation& fillInLocation) const; | |
| TIterator* | CreateFixupIterator() |
| const; | |
| }; | |

The object code property delegates the fixup work to individiual fixup objects.

```
class TFixup {
public
    void              DoFixup(void* moduleBase) = 0;
private:
    TComponent* fReference;
    long             fOffset;
};
```

Derived from TFixup are the classes TPCRelativeFixup, TAbsoluteFixup, and TDataRelativeFixup. Each fixup class understands how to perform the appropriate patching for its type. This is completely different than the normal compiler/linker interaction where the linker must interpret different bits to decide what action to take. Another advantage of this approach is that a new compiler for a new architecture doesn't have to worry about a fixup type not being supported in the linker.

Reference Types

The linker must handle 4 types of references. They are code-to-code, code-to-data, data-to-code, and data-to-data. The way each type of reference is handled (for 68K) is described below:

| Code-to-Code | |
|---|---|
| Example; | Foo(); |

The compiler handles this case in two different ways depending on the context. It can either go pc-relative to Foo(), or it can load the address of Foo(), and go indirect through a register. Any internal call can use either style. The linker will always report the address of the linkage area. Cross-library cans must use the load address of style. These will use absolute addresses that will be patched at load time.

| Code-to-Data | |
|---|---|
| Example: | gValue = 1; |

The compiler will generate a pc-relative access to gValue. However, if gValue is in a different shared library, the compiler will automatically generate an indirection. The linker will catch the indirect reference and provide a local address which will be patched with the external address at load time.

| Data-to-Code & Data-to-Data | |
|---|---|
| Example (Data-to-Code): | void (*pfn)() = Foo; |
| Example (Data-to-Data): | int& pi = i; |

Since both of these references require absolute addresses, they will be handled during loading. The patching of data references at load time will be handled just like the patching of external references.

FIG. 25 shows what happens in each type of reference. All of these cases show the internal usage case. If an external library references these same components, this library will receive several GetExportAddress() calls at load time. In response to the GetExportAddress(), a library will return the internal linkage area address for functions, and the real address for data. This allows the functions to move around while the library is loaded.

Linkage Areas

The internal linkage area is completely homogeneous (each entry is: JMP address). The external area has different types of entries. A normal function call will have a jump instruction in the linkage area, while a virtual function call will have a thunk that indexes into the virtual table. Pointers to member functions have a different style of thunk.

While the invention has been described in terms of a preferred embodiment in a specific programming environment, those skilled in the art will recognize that the invention can be practiced with modification within the spirit and scope of the appended claims.

What is claimed is:

1. A method for creating a model of a computer program in a memory of a computer system, comprising the steps of:
   (a) the computer system creating a plurality of components, each component representing an element of the computer program in the memory of the computer system;
   (b) the computer system creating a plurality of properties associated with each of the components in the memory of the computer system;
   (c) the computer system determining the dependencies between each of the components of the computer program; and
   (d) the computer system storing each of the components, and their associated properties and dependencies, in a database in the memory of the computer system.

2. The method as recited in claim 1, including the step of displaying information associated with the computer program in at least one window.

3. The method as recited in claim 1, including the step of storing a plurality of attributes in the database associated with a particular component.

4. The method as recited in claim 1, including the step of storing the database on a disk.

5. The method as recited in claim 1, including the step of storing information associated with a particular component in a property associated with the component in the database.

6. The method as recited in claim 1, including the step of accessing the information in the database to perform compiles.

7. The method as recited in claim 1, including the step of accessing the information in the database to perform edit operations.

8. The method as recited in claim 1, including the step of accessing the information in the database to perform link operations.

9. The method as recited in claim 1, including the step of accessing the information in the database to perform load operations.

10. The method as recited in claim 1, including the step of the computer system storing a unique name and a container identification in a property associated with a particular component.

11. The method as recited in claim 1, including the step of the computer system storing a declaration property representing the compiled symbol table entry associated with a particular component.

12. The method as recited in claim 1, including the step of storing object code in a property associated with a particular component.

13. The method as recited in claim 1, including the step of storing a client in a property associated with a particular component.

14. The method as recited in claim 1, including the step of storing a reference in a property associated with a particular component.

15. The method as recited in claim 1, including the step of storing a kind associated with each component in the database.

16. A system for creating a model of a computer program in a memory of a computer system, comprising:
   (a) means for creating a plurality of component, each component representing an element of the computer program in the memory;
   (b) means for creating a plurality of properties associated with each of the components in the memory;
   (c) means for determining the dependencies between each of the components of the computer program; and
   (d) means for storing each of the components, and their associated properties and dependencies, in a database in the memory of the computer system.

17. The system as recited in claim 16, including means for displaying information associated with the computer program in at least one window.

18. The system as recited in claim 16, including means for storing a plurality of attributes in the database associated with a particular component.

19. The system as recited in claim 16, including means for storing the database on a disk.

20. The system as recited in claim 16, including means for storing information associated with a particular component in a property associated with the component in the database.

21. The system as recited in claim 16, including means for accessing the information in the database to perform compiles.

22. The system as recited in claim 16, including means for accessing the information in the database to perform edit operations.

23. The system as recited in claim 16, including means for accessing the information in the database to perform link operations.

24. The system as recited in claim 16, including means for accessing the information in the database to perform load operations.

25. The system as recited in claim 16, including means for storing a unique name and a container identification in a property associated with a particular embodiment.

26. The system as recited in claim 16, including means for storing a built state indicative of the status after a build operation in the property associated with a particular component.

27. The system as recited in claim 16, including means for storing a declaration property representing the compiled symbol table entry associated with a particular component.

28. The system as recited in claim 16, including means for storing object code in a property associated with a particular component.

29. The system as recited in claim 16, including means for storing a client and references in a property associated with a particular component.

30. The system as recited in claim 16, including means for storing a kind associated with each component in the database.

31. The method as recited in claim 1, including the step of storing an interface property associated with a particular component.

32. The method as recited in claim 1, including the step of storing an implementation property associated with a particular component.

33. The method as recited in claim 1, including the step of storing an errors property associated with a particular component.

34. The method as recited in claim 1, including the step of storing a plurality of compound components.

35. The method as recited in claim 34, including the step of storing a members property associated with a particular compound component.

36. The method as recited in claim 1, including the step of storing a project component.

37. The method as recited in claim 1, including the step of storing a change list property associated with the project component.

38. The method as recited in claim 1, including the step of storing an error list property associated with the project component.

39. The system as recited in claim 16, including means for storing an interface property associated with a particular component.

40. The system as recited in claim 16, including means for storing an implementation property associated with a particular component.

41. The system as recited in claim 16, including means for storing an errors property associated with a particular component.

42. The system as recited in claim 16, including means for storing a plurality of compound components.

43. The system as recited in claim 42, including means for storing a members property associated with a particular compound component.

44. The system as recited in claim 16, including means for storing a project component.

45. The system as recited in claim 16, including means for storing a change list property associated with the project component.

46. The system as recited in claim 16, including means for storing an error list property associated with the project component.

* * * * *